(12) United States Patent
Ims et al.

(10) Patent No.: US 12,330,379 B2
(45) Date of Patent: Jun. 17, 2025

(54) HEAT SEALING APPARATUSES AND METHODS OF USE THEREOF

(71) Applicant: The Procter & Gamble Company, Cincinnati, OH (US)

(72) Inventors: Matthew Ims, Cincinnati, OH (US); William R. Frailing, Cincinnati, OH (US); Gustav André Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 726 days.

(21) Appl. No.: 17/523,371

(22) Filed: Nov. 10, 2021

(65) Prior Publication Data

US 2023/0141479 A1 May 11, 2023

(51) Int. Cl.
*B29C 65/00* (2006.01)

(52) U.S. Cl.
CPC ...... *B29C 66/8122* (2013.01); *B29C 66/1122* (2013.01); *B29C 66/81821* (2013.01); *B29C 66/81871* (2013.01)

(58) Field of Classification Search
CPC ............ B29C 66/8122; B29C 66/1122; B29C 66/81821; B29C 66/81871
USPC ...................................... 156/583.4
See application file for complete search history.

(56) References Cited

U.S. PATENT DOCUMENTS

| 4,923,560 A | * | 5/1990 | Inselmann | .......... B32B 37/0046 100/324 |
| 8,627,869 B1 | * | 1/2014 | Matsumoto | ....... B29C 66/81465 156/583.1 |

* cited by examiner

*Primary Examiner* — James D Sells
(74) *Attorney, Agent, or Firm* — Richard L. Alexander

(57) ABSTRACT

A heating block assembly including one or more configurable insulator segments and a heater block having a first surface configured to removably receive the one or more configurable insulator segments, in which each of the one or more configurable insulator segments covers only a portion of the first surface. A method for sealing at least one portion of a package using such a heating block assembly is also disclosed.

21 Claims, 10 Drawing Sheets

HEAT SEALING APPARATUSES AND METHODS OF USE THEREOF

FIELD OF THE INVENTION

The invention generally relates to a heat sealing apparatus, and more particularly to a heat sealing apparatus having a configurable heat sealing surface and methods of using the same.

BACKGROUND OF THE INVENTION

A heat sealing machine may be used to seal one or more end surfaces of a package, such as an overwrap for absorbent articles. The package may then be subjected to a further heat shrinking process to achieve a tight wrap around the contents of the package. In some cases, the seals created by conventional heat sealing machines result in nonuniform heat shrinking, which may cause visual defects in the package such as bunching, wrinkling, and/or stretching. These visual defects may be particularly evident when the package includes graphics printed or otherwise formed in or on the package. The graphics may, for example, become distorted and/or change color, resulting in an undesirable visual appearance that may detract from a customer's impression of the product and/or manufacturer.

SUMMARY OF THE INVENTION

In accordance with an aspect of the present disclosure, a heating block assembly is disclosed, the heating block assembly comprising: one or more configurable insulator segments; and a heater block comprising a first surface configured to removably receive the one or more configurable insulator segments, in which each of the one or more configurable insulator segments covers only a portion of the first surface.

Each of the one or more configurable insulator segments may comprise an inner surface positioned adjacent to the first surface of the heater block and an outer surface opposite the inner surface. Each of the one or more configurable insulator segments may comprise a thickness of between 2.9 and 3.1 mm, in which the thickness is defined between the inner and outer surfaces. A temperature of the outer surface of each of the one or more configurable insulator segments may be between 20% and 30% less than a temperature of the first surface of the heater block.

The first surface of the heater block may comprise a first extension and a second extension, in which each of the one or more configurable insulator segments may comprise a first corresponding channel and a second corresponding channel configured to receive the respective first and second extensions.

The heater block may comprise aluminum, and each of the one or more configurable insulator segments may comprise polyether ether ketone.

The heater block may be configured to receive a heating cartridge, and the heater block may comprise a thermally conductive material.

The heating block assembly may further comprise one or more configurable conductor segments each comprising a thermally conductive material. The one or more configurable insulator segments may comprise a first insulator segment and a second insulator segment, in which the first and second insulator segments may be spaced apart from each other along a longitudinal length of the heater block by at least one of the one or more configurable conductor segments to define at least one heating zone. The first insulator segment may comprise a first length, and the second insulator segment may comprise a second length that is the same as or different from the first length.

In accordance with another aspect of the present disclosure, a heat sealing apparatus is disclosed, the heat sealing apparatus comprising at least a first heating block assembly and a second heating block assembly, each of which comprise: one or more configurable insulator segments; and a heater block comprising a first surface configured to removably receive the one or more configurable insulator segments, in which each of the one or more configurable insulator segments covers only a portion of the first surface.

The first heating block assembly may comprise a first insulator segment, and the second heating block assembly may comprise a second insulator segment, in which top edges and/or bottom edges of the first and second insulator segments may be horizontally aligned with each other when the first and second heating block assemblies are positioned side-by-side.

The heat sealing apparatus may further comprise a plurality of configurable conductor segments, in which the first heating block assembly may comprise first and second insulator segments spaced apart from each other along a longitudinal length of the heater block of the first heating block assembly by at least one of the plurality of configurable conductor segments and the second heating block assembly may comprise third and fourth insulator segments spaced apart from each other along a longitudinal length of the heater block of the second heating block assembly by at least one of the plurality of configurable conductor segments. The first and second heating block assemblies may be positioned side-by-side, in which top edges and/or bottom edges of the first and third insulator segments may be horizontally aligned with each other and/or top edges and/or bottom edges of the second and fourth insulator segments may be horizontally aligned with each other.

The first heating block assembly may be positioned to at least partially define a first heat sealing surface configured to seal a portion of a first end surface of a package, and the second heating block assembly may be positioned opposite the first heating block assembly to at least partially define a second heat sealing surface configured to seal a portion of a second end surface of the package.

In accordance with a further aspect of the present disclosure, a heat sealing apparatus is disclosed, the heat sealing apparatus comprising: a configurable heat sealing surface comprising one or more heating zones each defined by one or more configurable insulator segments and one or more configurable conductor segments, in which each of the one or more configurable insulator segments covers only a portion of the configurable heat sealing surface.

The configurable heat sealing surface may comprise a first configurable heat sealing surface, and the heat sealing apparatus may further comprise a second configurable heat sealing surface that may comprise one or more second heating zones each defined by one or more second configurable insulator segments and one or more second configurable conductor segments, in which each of the one or more second configurable insulator segments covers only a portion of the second configurable heat sealing surface. The first configurable heat sealing surface may comprise a first insulator segment configuration, and the second configurable heat sealing surface may comprise a second insulator segment configuration that is the same as or different from the first insulator segment configuration. The first configurable heat sealing surface may comprise one or more first heating block assemblies, each of which may comprise a first heater block with a first surface configured to removably receive the one or more configurable insulator and conductor segments, and the second configurable heat sealing surface may comprise one or more second heating block assemblies, each of which may comprise a second heater block with a first surface configured to removably receive the one or more second configurable insulator and conductor segments. The one or more configurable insulator segments may each cover only a portion of the first surface of the first heater block, and the one or more second configurable insulator segments may each cover only a portion of the first surface of the second heater block.

The one or more first heating block assemblies may comprise a first plurality of heating block assemblies, which may comprise a first pair of heating block assemblies and a second pair of heating block assemblies positioned side-by-side with the first pair of heating block assemblies, in which the heat sealing apparatus may further comprise a controller operatively coupled to each of the first plurality of heating block assemblies and configured to selectively operate the first and second pairs of heating block assemblies. The first pair of heating block assemblies may comprise a first insulator segment configuration, and the second pair of heating block assemblies may comprise a second insulator segment configuration that is different from the first insulator segment configuration, in which the controller may be configured to selectively provide power to the first and second pair of heating block assemblies such that the one or more heating zones of the first pair of heating block assemblies may comprise a first temperature and the one or more second heating zones of the second pair of heating block assemblies may comprise a second temperature that is different from the first temperature.

In accordance with a further aspect of the present disclosure, a method for sealing at least one portion of a package is disclosed, the method comprising: providing a configurable heat sealing surface; selectively adjusting a configuration of the configurable heat sealing surface to define one or more heating zones; and advancing the package along the configurable heat sealing surface adjacent to the one or more heating zones to seal the at least one portion of the package.

Selectively adjusting the configuration of the configurable heat sealing surface may comprise adjusting (i) a number of heating zones, (ii) a vertical location of the one or more heating zones, (iii) a horizontal location of the one or more heating zones, and/or (iv) a dimension of the one or more heating zones.

The configurable heat sealing surface may comprise a plurality of heating block assemblies each comprising a heater block with one or more configurable insulator segments and one or more configurable conductor segments that define the one or more heating zones. Selectively adjusting the configuration of the configurable heat sealing surface may comprise, for each heating block assembly, selectively positioning the one or more configurable insulator and conductor segments along a longitudinal length of the heater block to define the one or more heating zones.

The plurality of heating block assemblies may comprise a first pair of heating block assemblies and a second pair of heating block assemblies, in which the method may further comprise selectively operating the first and second pairs of heating block assemblies to seal the at least one portion of the package. The first and second pair of heating block assemblies may be positioned side-by-side. The package may comprise a first package, in which the method may further comprise: selectively providing power to the first pair of heating block assemblies to seal the at least one portion of the first package; after sealing the at least one portion of the first package, advancing a second package along the configurable heat sealing surface; and selectively providing power to the second pair of heating block assemblies to seal at least one portion of the second package. The first pair of heating block assemblies may comprise a first insulator segment configuration, and the second pair of heating block assemblies may comprise a second insulator segment configuration different from the first insulator segment configuration.

The configuration of the configurable heat sealing surface may comprise a first configuration, in which the method may further comprise, after sealing the at least one portion of the package, selectively adjusting the configuration of the configurable heat sealing surface to comprise a second configuration defining one or more second heating zones, the second configuration being different from the first configuration. The method may further comprise advancing a second package along the configurable heat sealing surface adjacent to the one or more second zones to seal at least one portion of the second package.

The one or more heating zones may comprise a first heating zone and a second heating zone that is positioned above or below the first heating zone, in which the package may comprise a first package and the method may further comprise: positioning a second package above or below the first package; and advancing the second package along the configurable heat sealing surface with the first package, in which one of the first or the second heating zone seals the at least one portion of the first package and the other of the first or the second heating zone simultaneously seals at least one portion of the second package.

The configurable heat sealing surface may comprise a first configurable heat sealing surface, in which the method may further comprise: providing a second configurable heat sealing surface positioned opposite the first configurable heat sealing surface; and selectively adjusting a configuration of the second configurable heat sealing surface to define one or more second heating zones. The at least one portion of the package may comprise a first end surface, and advancing the package along the first configurable heat sealing surface may seal at least a section of the first end surface of the package. The at least one portion of the package may further comprise a second end surface positioned opposite the first end surface, in which the method may further comprise advancing the package along the second configurable heat sealing surface adjacent to the one or more second heating zones to seal at least one section of the second end surface of the package. The package may be advanced along the first and second configurable heat sealing surfaces such that the at least one sections of the first and second end surfaces of the package are sealed simultaneously.

The method may further comprise, after advancing the package along the configurable heat sealing surface, subjecting the package to a heat shrinking process.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

The present disclosure relates to a heat sealing apparatus having a configurable heat sealing surface and methods of use thereof. The heat sealing surface comprises configurable insulator and conductor segments that permit greater control over sealing of packages by minimizing a size of a heating zone to that necessary to form a minimally sufficient seal that serves to hold the package ends together long enough to undergo a subsequent heat shrinking process.

As described herein, a package may be formed by folding a plastic overwrap, e.g., polyethylene, over and around a matrix of one or more articles and closing one or more ends of the overwrap by folding end flaps in an overlapping relationship, e.g., an envelope folding pattern, and delivering the package to a heat sealing section where heat is applied to the end surface(s) of the package to fuse together the layers of material of the end flaps. The package then enters a heat shrink tunnel where heat, e.g., convective heat, is applied to all sides of the package, which causes the plastic overwrap to expand before shrinking to create a tight fit around the matrix of articles. Conventional heat sealing machines generally provide a single, large heating zone that extends across an entirety of the heat sealing surface, such that substantially an entirety of the end surface of the package is subjected to heating while in the heat sealing section. It was found that this large heat sealing surface causes the overwrap material to undergo heat shrinking at the heat sealing section and leads to complete sealing of the end prior to entering the heat shrink tunnel. This premature heat shrinking creates a boundary where the overwrap material is prevented from naturally flowing during the heat shrink process, which produces localized bunching of the overwrap material. The overwrap often contains ink from, for example, graphics printed on one or more display panels, and the bunching of the overwrap material on the ends causes undesirable collection of the ink and distortion of the graphics (referred to herein as "veining").

A heat sealing apparatus with a configurable heat sealing surface in accordance with the present disclosure enables a size of the heating zone to be reduced and minimizes a heat affected area on the end surface of the package. The smaller heating zone reduces or eliminates premature heat shrinking, which allows the overwrap material to flow properly during heat shrinking and reduces veining on the display panel(s). The configurable heat sealing surface may be tailored to create a heating zone with the size needed for each specific matrix of articles and may be configured to provide two or more heating zones. As described herein, one or more properties of the heating zone(s) may be altered quickly and easily, without the need to disassemble portions of the heat sealing apparatus.

Figure 1:
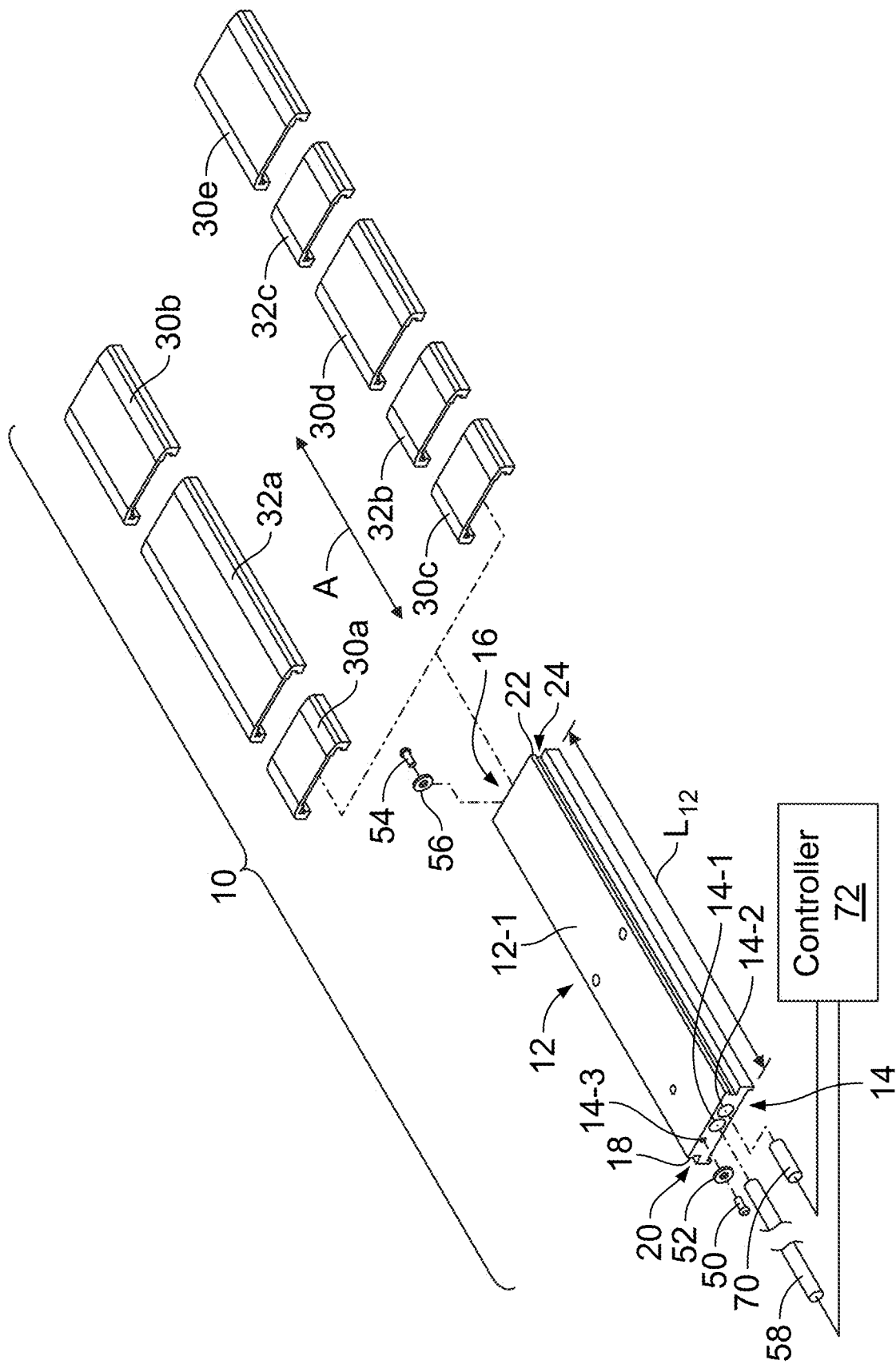
FIG. 1 is an exploded view of a heating block assembly, in accordance with the present disclosure.

With reference to FIG. 1, a heating block assembly 10 is shown, which may include a heater plate or block 12, one or more configurable insulator segments 30a-30e, and one or more configurable conductor segments 32a-32c. The heater block 12 may comprise a first surface 12-1 that is configured to removably receive the one or more configurable insulator segments 30a-30e and conductor segments 32a-32c, as described in more detail below. The first surface 12-1 of the heater block 12 may be substantially planar or smooth, as shown in in FIG. 1.

The heater block 12 comprises a first end 14 and a second end 16. The first end 14 may comprise a threaded bore 14-3, and the second end 16 may comprise a similar threaded bore (not visible), in which the threaded bore 14-3 at the first end 14 and the threaded bore at the second end 16 are configured to receive a fastener 50, 54, respectively, as described herein. The first end 14 comprises a first opening 14-1 and a second opening 14-2, as shown in FIG. 1. In the example shown, the first opening 14-1 may be configured to receive a heating element 58 that extends along at least a portion of a longitudinal length $L_{12}$ of the heater block 12 and provides heat to the heating block assembly 10. In the example shown, the heating element 58 comprises a cartridge heater, which may include a single zone or a multi zone cartridge heater. The second opening 14-2 may be configured to receive a temperature sensor 70 such as a thermocouple or a resistance temperature detector. As described in more detail below, the heating element 58 and the temperature sensor 70 may be operatively coupled to a controller 72 that receives temperature data from the temperature sensor 70 and adjusts operation of the heating element 58 to achieve a desired temperature. Although the heater block 12 in FIG. 1 is depicted as being configured to receive a cartridge heater, it is understood that other types of heating elements 58 could be used, such as a tubular heater. With reference to the end view shown in FIG. 3, the second end 16 of the heater block 12 may comprise a first opening 16-1, which may be connected to the first opening 14-1 in the first end 14.

Figure 3:
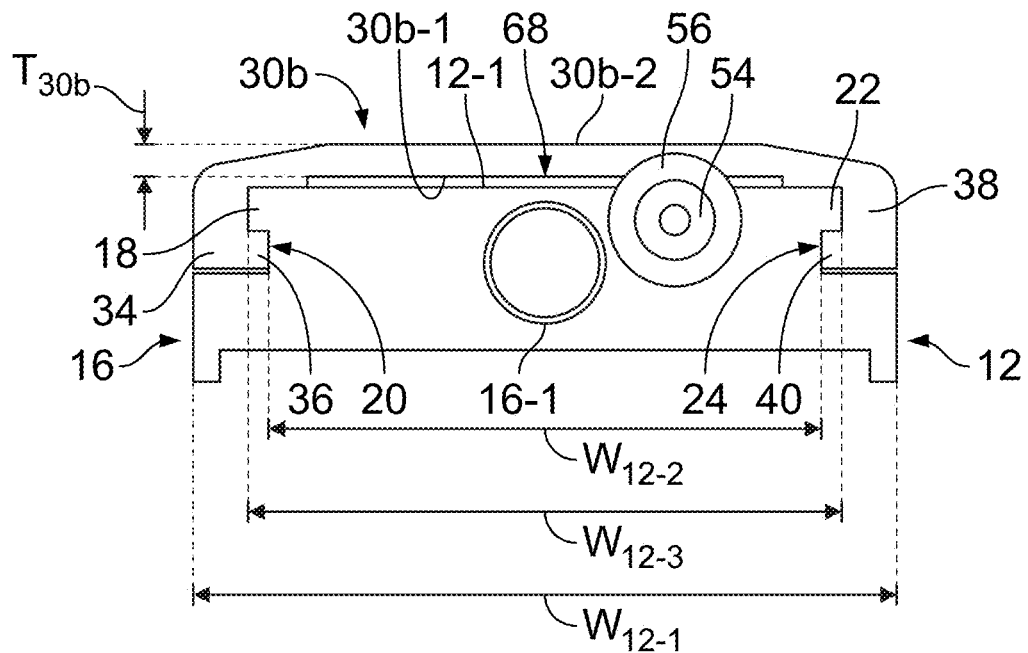
FIG. 3 is an end view of the heating block assembly taken along view line 3-3 in FIG. 2.

As shown in FIGS. 1 and 3, the first surface 12-1 of the heater block 12 includes a first extension 18 and a second extension 22 that extends in a direction opposite the first extension 18. The first and second extensions 18, 22 define respective first and second channels 20, 24, which may extend along an entirety of the longitudinal length $L_{12}$ of the heater block 12. The heater block 12 may include a first width $W_{12-1}$ at or near a second surface 12-2, a second width $W_{12-2}$ defined by the channels 20, 24, and a third width $W_{12-3}$ defined by the extensions 18, 22. The first width $W_{12-1}$ may be a maximum width of the heater block 12, and the second width $W_{12-2}$ may be a minimum width of the heater block 12. The third width $W_{12-3}$ may fall between the first and second widths $W_{12-1}$, $W_{12-2}$ such that the extensions 18, 22, the channels 20, 24, and the first surface 12-1 of the heater block 12 may together define a capital "T" shape. The first surface 12-1 of the heater block 12, specifically the extensions 18, 22 and the channels 20, 24, may be configured to removably receive the one or more configurable insulator and conductor segments 30a-30e, 32a-32c.

With reference to the detailed view in FIG. 3, the insulator segment 30b may comprise an inner surface 30b-1 and an outer surface 30b-2 that is opposite the inner surface 30b-1, in which the inner surface 30b-1 of the insulator segment 30b is positioned adjacent to the first surface 12-1 of the heater block 12. The insulator segment 30b may further comprise a first sidewall 34 with a first lip 36 and a second sidewall 38 with a second lip 40. The first and second lips 36, 40 extend inward toward each other and may be substantially perpendicular to the first and second sidewalls 34, 38 and substantially parallel to the inner and outer surfaces 30b-1, 30b-2 of the insulator segment 30b, such that the inner surface 30b-1, the sidewalls 34, 38, and the lips 36, 40 of the insulator segment 30 may together define a slot in the shape of a capital "T." The first lip 36 is received in the first channel 20 of the heater block 12, and the second lip 40 is received in the second channel 24 to secure the insulator segment 30b to the heater block 12. A width (not separately labeled) of an outer surface of the first and second sidewalls 34, 38 may be substantially similar to the first width $W_{12-1}$ of the heater block 12, such that sides of the heating block assembly 10 are substantially smooth and seamless. A portion of the outer surface 30b-2 adjacent to the sidewalls 34, 38 may comprise a chamfer or slope to minimize impacts along edges of the insulator segment 30b and to ensure that packages and other objects move smoothly along the outer surface 30b-2.

Although not labeled, it can be seen in FIG. 1 that all of the insulator and conductor segments 30a, 30c-30e, 32a-32c comprise a structure that is substantially similar to the insulator segment 30b shown in detail in FIG. 3. As shown in FIG. 1, the insulator and conductor segments 30a-30e, 32a-32c may be installed on the heater block 12 from the first or the second end 14, 16 by sliding the insulator and conductor segments 30a-30e, 32a-32c onto the first surface 12-1 of the heater block 12 in a direction indicated by arrow A. With reference to FIG. 3, it can be seen that engagement between the lips 36, 40 of the insulator segment 30b and the channels 20, 24 of the heater block 12 prevents movement of the insulator segment 30b in any direction other than the direction indicated by arrow A in FIG. 1. The insulator and conductor segments 30a, 30c-30e, 32a-32c shown in FIG. 1 may similarly be secured to the heater block 12.

Figure 2:
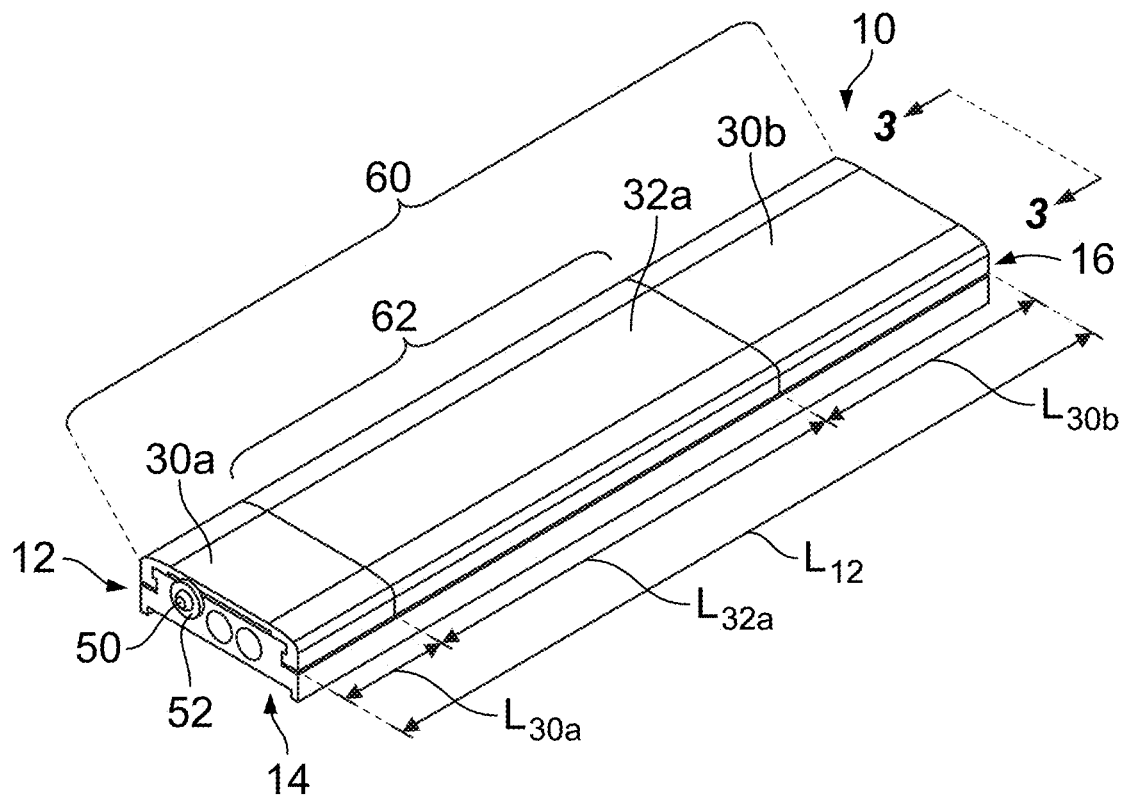
FIG. 2 is a perspective view of one example of the heating block assembly of FIG. 1 following assembly.
Figure 4:
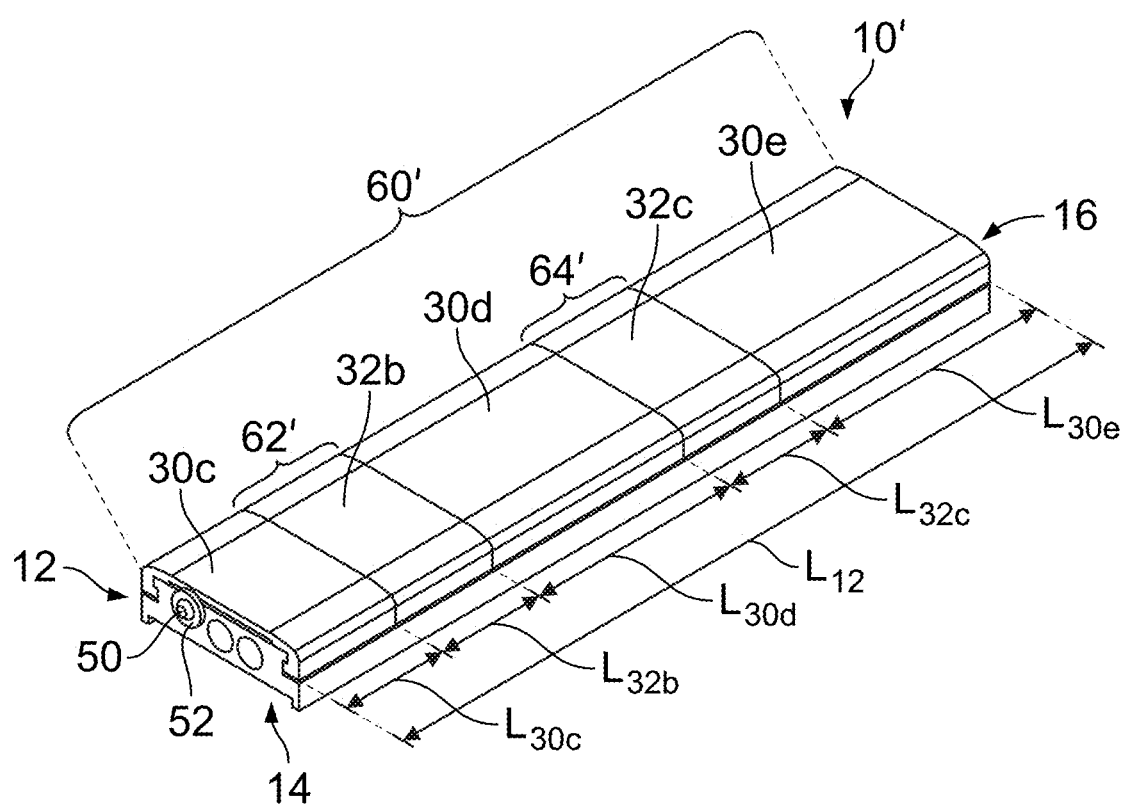
FIG. 4 is a perspective view of another example of the heating block assembly of FIG. 1 following assembly.

One or more of the insulator segments 30a-30c and the conductor segments 32a-32c may be installed on the heater block 12 of FIG. 1 to generate the heating block assemblies 10, 10' depicted in FIGS. 2-4. Following installation of the insulator and conductor segment(s) 30a-30e, 32a-32c onto the heater block 12, the fasteners 50, 54 may be used to secure the insulator and conductor segments 30a-30e, 32a-32c and prevent movement of the insulator and conductor segments 30a-30e, 32a-32c in the direction indicated by arrow A. As shown in FIGS. 1, 2, and 4, the fastener 50, e.g., a screw, may extend through a washer 52 and be received in the threaded bore 14-3 formed in the first end 14 of the heater block 12. The washer 52 extends above the first surface 12-1 of the heater block 12 to prevent the insulator and conductor segments 30a-30e, 32a-32c from moving past the first end 14. Similarly, as shown in FIGS. 1 and 3, the fastener 54 may extend through a washer 56 and be received in the threaded bore (not shown) formed in the second end 16 of the heater block 12, in which the washer 56 extends above the first surface 12-1 of the heater block 12 to prevent the insulator and conductor segments 30a-30e, 32a-32c from moving past the second end 16.

The heating block assembly 10, 10' shown in FIGS. 1-4, including the heater block 12 and the one or more insulator and conductor segments 30a-30e, 32a-32c, may define a respective configurable heat sealing surface 60, 60' or a portion thereof. A configuration of the configurable heat sealing surface 60, 60' may be altered by changing one or more of a number, dimension, and location of the one or more insulator and conductor segments 30a-30e, 32a-32c, as described herein.

With reference to the heating block assembly 10 shown in FIG. 2, the heater block 12 comprises insulator segments 30a and 30b and conductor segment 32a, which define one exemplary heat sealing surface 60 or portion thereof. The insulator segment 30a is positioned adjacent to the first end 14 of the heater block 12, the insulator segment 30b is positioned adjacent to the second end 16 of the heater block 12, and the conductor segment 32a is positioned between the insulator segments 30a, 30b to space the insulator segments 30a, 30b apart from each other along the longitudinal length $L_{12}$ of the heater block 12.

The heating block assembly 10' in FIG. 4 comprises insulator segments 30c-30e and conductor segments 32b, 32c, in which the insulator segment 30c is positioned adjacent to the first end 14 of the heater block 12, the insulator segment 30e is positioned adjacent to the second end 16 of the heater block 12, and the insulator segment 30d is positioned between the insulator segments 30c, 30e. The conductor segment 32b is positioned between the insulator segments 30c, 30d, and the conductor segment 32c is positioned between the insulator segments 30d, 30e to space the insulator segments 30c-30e apart from each other along the longitudinal length Lie of the heater block 12 and to define another exemplary heat sealing surface 60' or portion thereof.

The insulator segments 30a-30e may comprise a material with low thermal conductivity, e.g., from about 0.15 to about 0.95 W/(m·K)±0.02 W/(m·K), such as polyetheretherketone (PEEK), which may have an average thermal conductivity of about 0.25 W/(m·K). Another example of a material with low thermal conductivity may include polytetrafluoroethylene. The heater block 12 and the conductor segments 32a-32c may comprise a material with a high thermal conductivity, e.g., greater than about 200 W/(m·K), such as one or more metals (e.g., aluminum or copper), alloys (e.g., brass or bronze), or combinations thereof. The heater block 12 may be made from a single (monolithic) piece of material such as anodized aluminum that is a good thermal conductor, resists wear and oxidation, and provides a lower coefficient of friction to enable the insulator and conductor segments 30a-30e, 32a-32c to slide on and off more easily. The heater block 12 and the conductor segments 32a-32c may comprise the same material, e.g., aluminum, or may comprise one or more different materials as compared to each other.

The one or more insulator segments 30a-30e may cover only a portion of the first surface 12-1 of the heater block 12. As shown in FIGS. 2 and 4, in examples comprising two or more insulator segments 30a-30e, the insulator segments 30a-30e may be spaced apart from each other via one or more conductor segments 32a-32c. The heat sealing surface 60, 60' may comprise one or more heating zones 62, 62', 64' that are defined by the conductor segments 32a-32c, specifically by a position of the insulator segments 30a-30e with respect to the conductor segments 32a-32c along the longitudinal length $L_{12}$ of the heater block 12. When heat is applied to the heater block 12, e.g., via the heating element 58 shown in FIG. 1, the insulator segments 30a-30e reduce the amount of heat transmitted to corresponding portions of the heat sealing surface 60, 60', while the conductor segments 32a-32c conduct the heat from the heater block 12 to corresponding portions of the heat sealing surface 60, 60'. For example, with reference to FIG. 2, the heat sealing surface 60 comprises one large heating zone 62 that is located toward a longitudinal center of the heater block 12 and is defined by insulator segments 30a, 30b and conductor segment 32a. In FIG. 4, the heat sealing surface 60' comprises two smaller heating zones 62', 64' that are defined by insulator segments 30c-30e and conductor segments 32a, 32b.

The insulator and conductor segments 30a-30e, 32a-32c may be manufactured to have any desired longitudinal length. With reference to FIGS. 2 and 4, the insulator segments 30a-30e may each comprise a respective length $L_{30a}$-$L_{30c}$, and the conductor segments 32a-32c may each comprise a respective length $L_{32a}$-$L_{32c}$. The lengths $L_{30a}$-$L_{30c}$ of the insulator segments 30a-30e within the heating block assembly 10, 10' may be the same as or different from each other. For example, as shown in FIG. 2, the length $L_{30a}$ of the insulator segment 30a is different from, i.e., less than, the length $L_{30b}$ of the insulator segment 30b. As shown in FIG. 4, the length $L_{30d}$ of the insulator segment 30d is the same as the length $L_{30e}$ of the insulator segment 30e, while the length $L_{30e}$ of the insulator segment 30c is different from, i.e., less than, the lengths $L_{30d}$, $L_{30e}$ of the insulator segments 30d, 30e. The lengths $L_{32a}$-$L_{32c}$ of the conductor segments 32a-32c within the heating block assembly 10, 10' may likewise be the same as or different from each other. For example, as shown in FIG. 4, the length $L_{32b}$ of the conductor segment 32b is the same as the length $L_{32c}$ of the conductor segment 32c.

A configuration of the heat sealing surfaces 60, 60' may be selectively adjusted to define the one or more heating zones 62, 62', 64'. In particular, an insulator and/or conductor configuration of the heating block assemblies 10, 10' in FIGS. 2-4 may be altered to achieve a desired number of heating zones 62, 62', 64' with the desired dimension(s) and/or desired vertical location(s) along the longitudinal length $L_{12}$ of the heater block 12. One or more of the insulator and/or conductor segments 30a-30e, 32a-32c may be removed from the heater block 12 by sliding them off of the first or second end 14, 16 of the heater block 12 in the direction indicated by arrow A in FIG. 1 and replacing them with one or more additional insulator and/or conductor segments having a different length that are selectively positioned along the longitudinal length $L_{12}$ of the heater block 12 (e.g., by sliding the one or more additional insulator and/or conductor segments onto the first surface 12-1 of the heater block 12 in the direction indicated by arrow A).

Although the insulator segments 30a-30e in FIGS. 2 and 4 are depicted as being separated by one conductor segment 32a-32c each, it should be understood that the insulator segments 30a-30e may be separated by two or more conductor segments 32a-32c that are positioned adjacent to each other along the longitudinal length $L_{12}$ of the heater block 12 without insulator segments 30a-30c positioned therebetween. Likewise, two or more insulator segments 30a-30e may be positioned adjacent to each other along the longitudinal length $L_{12}$ of the heater block 12 without conductor segment(s) 32a-32c positioned therebetween. In addition, although FIG. 4 depicts two heating zones 62', 64', it should be understood that any number of heating zones, including three or more, may be possible.

With reference to FIGS. 1 and 3, a temperature of the outer surface 30b-2 of the insulator segment 30b may be between 20% and 30% less than a temperature of the first surface 12-1 of the heater block 12 due to the insulator segment 30b being comprised of a material with low thermal conductivity. The insulator segment 30b may comprise a thickness $T_{30b}$ of between 2.9 and 3.1 mm, as measured between the inner and outer surfaces 30b-1, 30b-2 shown in FIG. 3. A central portion of the inner surface 30b-1 of the insulator segment 30b may be spaced apart from an adjacent portion of the first surface 12-1 of the heater block 12 to define an air gap 68 therebetween. The air gap 68 serves to further reduce conduction of heat from the heater block 12 to the outer surface 30b-2 of the insulator segment 30b. The air gap 68 may be between 0.9 and 1.1 mm, such that the outer surface 30b-2 of the insulator segment 30b is spaced apart from the first surface 12-1 of the heater block 12 by about 4 mm. The other insulator segments 30a, 30c-30e shown in FIGS. 1, 2, and 4 may comprise substantially similar structures and thicknesses and may achieve similar temperature differences between their respective outer surfaces (not labeled) and the first surface 12-1 of the heater block 12. The conductor segments 32a-32c, which do not define an air gap, may comprise a corresponding thickness (not shown) of about 4 mm so that substantially an entirety of inner surfaces (not labeled) of the conductor segments 32a-32c contact the first surface 12-1 of the heater block 12 and outer surfaces (not labeled) of the conductor segments 32a-32c are flush with the outer surfaces of the insulator segments 30a-30e, as seen in FIGS. 2 and 4, to ensure that packages and other objects move smoothly along the heat sealing surface 60, 60' (see also FIGS. 9 and 10). A temperature of an outer surface (not labeled) of the conductor segments 32a-32c may be substantially similar to a temperature of the heater block 12 due to the conductor segments 32a-32c being comprised of a material with a high thermal conductivity.

Figure 5:
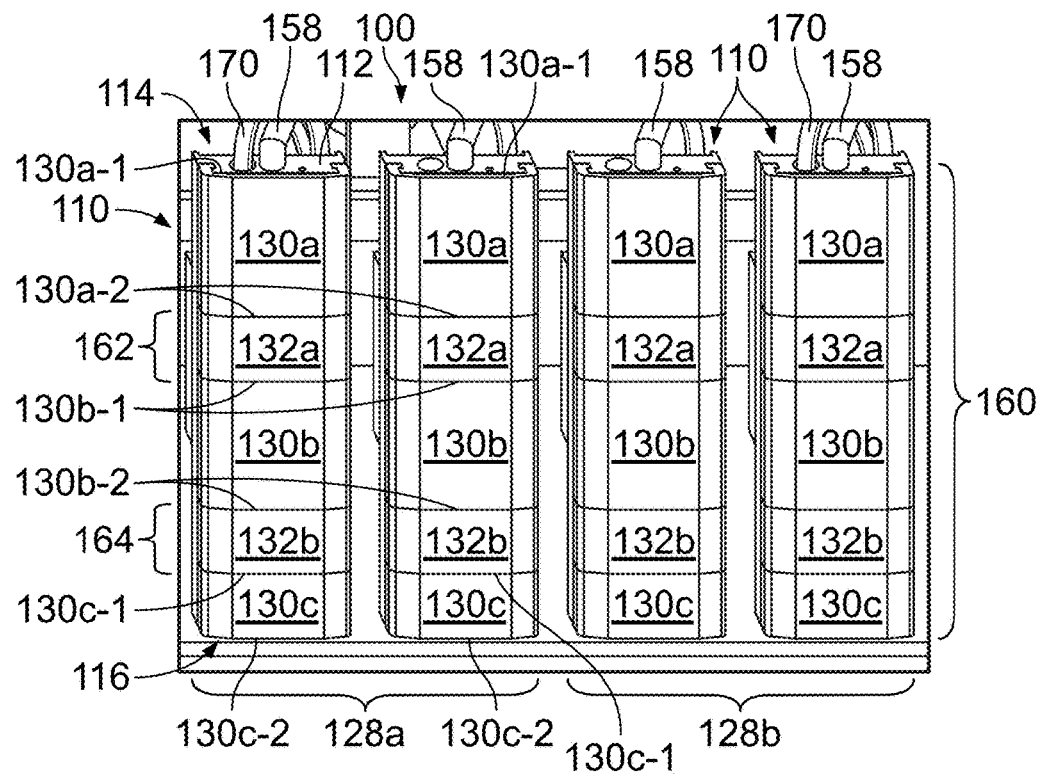
FIG. 5 is a perspective view of an exemplary heat sealing apparatus, in accordance with the present disclosure.
Figure 6:
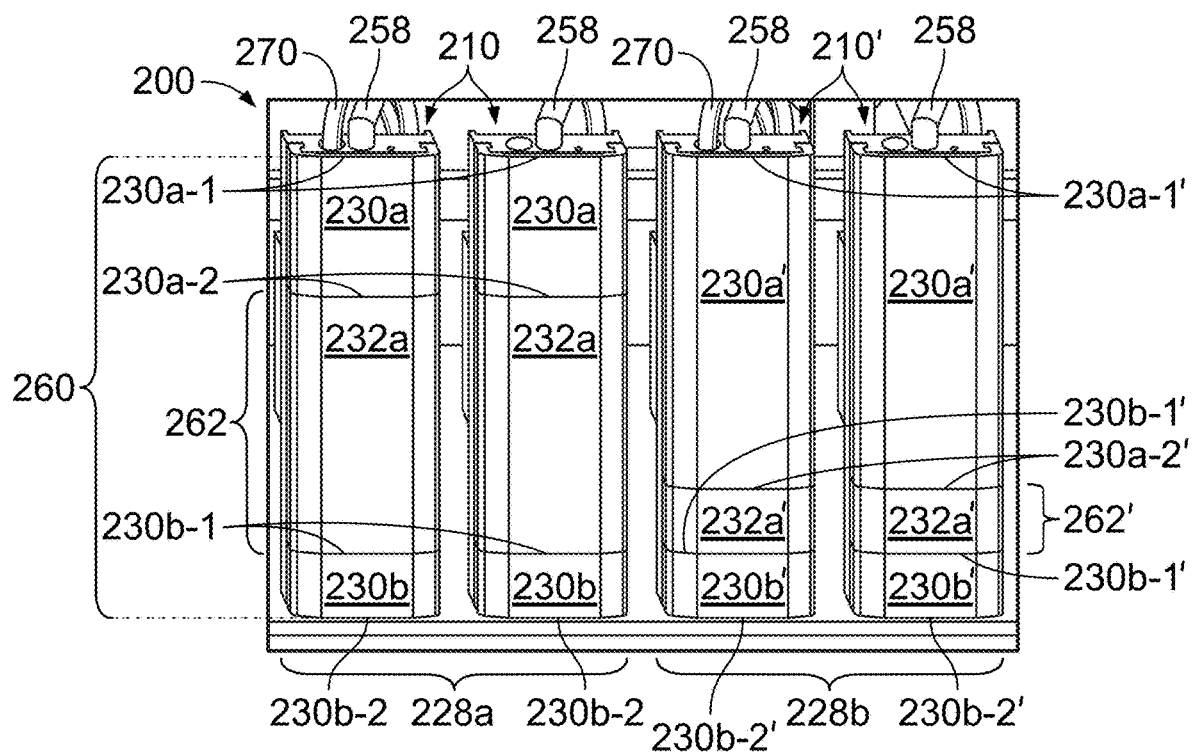
FIG. 6 is a perspective view of another exemplary heat sealing apparatus, in accordance with the present disclosure.
Figure 7:
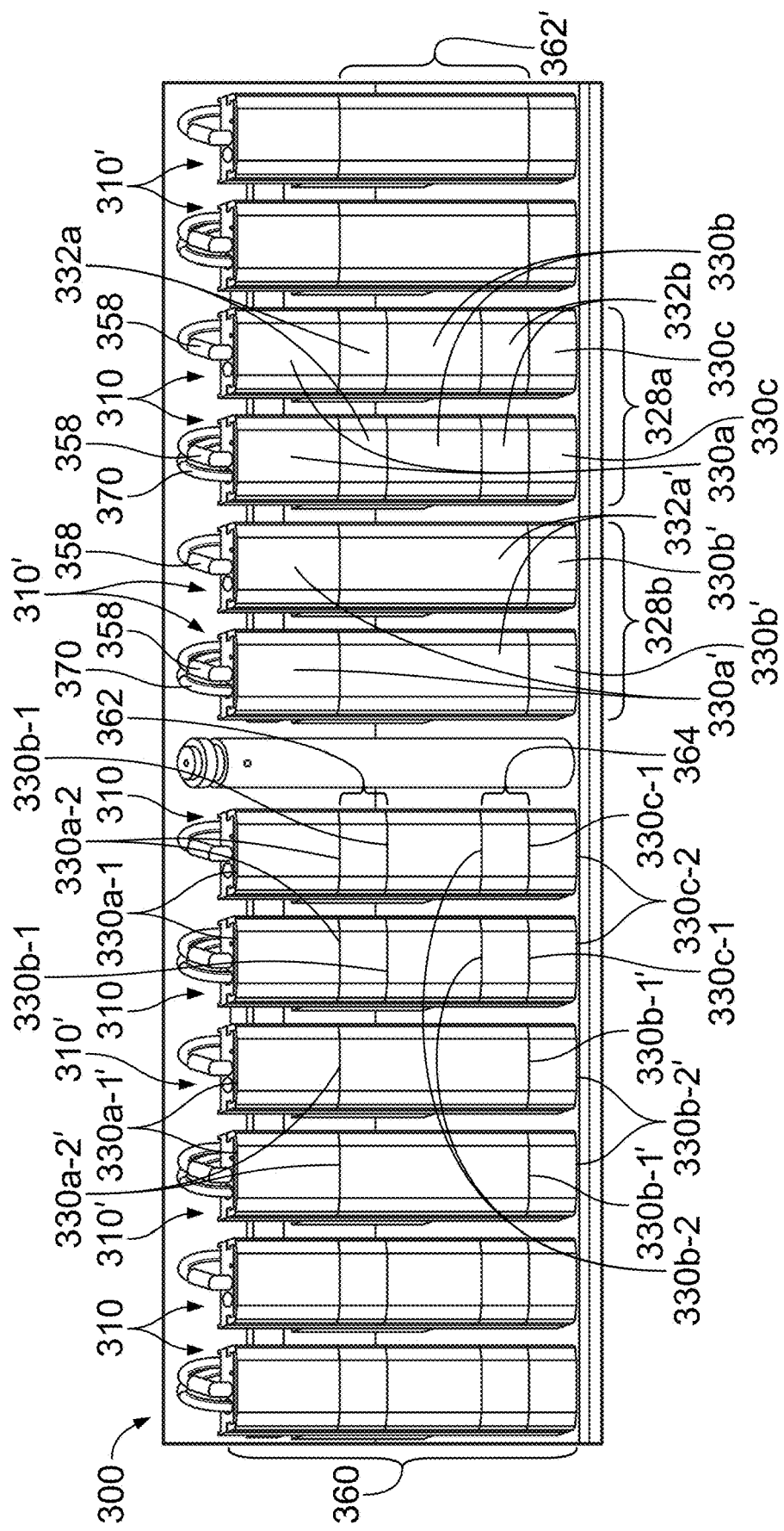
FIG. 7 is a perspective view of a further exemplary heat sealing apparatus, in accordance with the present disclosure

FIGS. 5-7 illustrate exemplary heat sealing apparatuses 100, 200, 300 comprising a respective configurable heat sealing surface 160, 260, 360, in accordance with the present disclosure. As used herein, the term "vertical" may be used to refer to a location, position, or dimension in a direction parallel to the longitudinal length $L_{12}$ of the heater block 12 shown in FIGS. 1, 2, and 4, while the terms "horizontal" or "lateral" may be used to refer to a location, position, or dimension in a direction parallel to the width $W_{12}$ of the heater block 12 shown in FIG. 3. Only a portion of the elements in FIGS. 5-7 are labeled in order to illustrate other aspects of each heat sealing apparatus 100, 200, 300 in detail. It should be understood that unless indicated otherwise, the heating block assemblies 110, 210/210', 310/310' within each heat sealing apparatus 100, 200, 300 may all include components that are substantially similar to each other.

With reference to FIG. 5, the heat sealing apparatus 100 comprises a plurality of heating block assemblies 110 that each comprise insulator segments 130a-130c and conductor segments 132a, 132b. The insulator segment 130a may be positioned adjacent to a first end 114 of a heater block 112, the insulator segment 130c may be positioned adjacent to a second end 116 of the heater block, and the insulator segment 130b may be positioned between the insulator segments 130a, 130c. The conductor segment 132a may be positioned between insulator segments 130a, 130b, and the conductor segment 132b may be positioned between insulator segments 130*b*, 130*c* to space apart the respective insulator segments 130*a*-130*c* and define respective heating zones 162, 164 in each heating block assembly 110. The heating block assemblies 110 may be horizontally aligned, side-by-side, along their longitudinal lengths (not labeled; see FIG. 1) to define one exemplary configurable heat sealing surface 160. An insulator and/or conductor segment configuration may be the same across all of the heating block assemblies 110.

The heat sealing apparatus 200 of FIG. 6 comprises a plurality of heating block assemblies 210, 210' horizontally aligned, side-by-side, along their longitudinal lengths (not labeled; see FIG. 1) to define another exemplary configurable heat sealing surface 260, in which the heating block assemblies 210 comprise a different insulator and/or conductor segment configuration than the heating block assemblies 210'. The heating block assemblies 210 may each comprise two insulator segments 230*a*, 230*b* that are spaced apart by a conductor segment 232*a* to define a heating zone 262. The heating block assemblies 210' may each comprise two insulator segments 230*a*', 230*b*' that are spaced apart by a conductor segment 232*a*' to define a heating zone 262'. It can be seen that the insulator segments 230*a*' comprise a length (not labeled) that is much larger than a length (not labeled) of the insulator segments 230*a* and that the conductor segments 232*a* comprise a length (not labeled) that is much larger than a length (not labeled) of the conductor segments 232*a*'. The insulator segments 230*b*, 230*b*' may have a length that is substantially the same, such that the heating zone 262 of the heating block assemblies 210 is larger than the heating zone 262'.

FIG. 7 depicts a heat sealing apparatus 300 comprising a further exemplary configurable heat sealing surface 360. The heat sealing apparatus 300 may comprise a plurality of heating block assemblies 310, 310' horizontally aligned, side-by-side, along their longitudinal lengths (not labeled; see FIG. 1), in which the heating block assemblies 310 comprise a different insulator and/or conductor segment configuration than the heating block assemblies 310'. The heating block assemblies 310 may be substantially similar to the heating block assemblies 110 shown in FIG. 5 and may each comprise three insulator segments 330*a*-330*c* that are spaced apart by conductor segment 332*a*, 332*b* to define two heating zones 362, 364. The heating block assemblies 310' may be substantially similar to the heating block assemblies 210 shown in FIG. 6 and may each comprise two insulator segments 330*a*', 330*b*' that are spaced apart by a conductor segment 332*a*' to define a heating zone 362'.

In some examples, top and/or bottom edges of one or more of the insulator segments within adjacent heating block assemblies may be horizontally aligned with each other. As shown in FIG. 5, because the heating block assemblies 110 all comprise the same insulator and conductor segment configuration, top edges 130*a*-1 and bottom edges 130*a*-2 of the insulator segments 130*a* are horizontally aligned with each other across all of the heating block assemblies 110. Top and bottom edges 130*b*-1, 130*b*-2 of the insulator segments 130*b* and top and bottom edges 130*c*-1, 130*c*-2 of the insulator segments 130*c* are likewise all horizontally aligned with each other.

In FIGS. 6 and 7, the heating block assemblies 210, 210' and 310, 310' comprise different insulator and/or conductor segment configurations, such that the top and/or bottom edges of one or more of the insulator segments may not be aligned with each other. For example, as shown in FIG. 6, top edges 230*a*-1 of the insulator segments 230*a* in the heating block assemblies 210 are horizontally aligned with top edges 230*a*-1' of the insulator segments 230*a*' in the heating block assemblies 210', but bottom edges 230*a*-2 of the insulator segments 230*a* are not aligned with bottom edges 230*a*-2' of the insulator segments 230*a*'. Top edges 230*b*-1, 230*b*-1' and bottom edges 230*b*-2, 230*b*-2' of the insulator segments 230*b*, 230*b*' are horizontally aligned with each other across all of the heating block assemblies 210, 210'.

In FIG. 7, top and bottom edges 330*a*-1, 330*a*-2 of the insulator segments 330*a* in the heating block assemblies 310 are horizontally aligned with top and bottom edges 330*a*-1', 330*a*-2' of the insulator segments 330*a*' in the heating block assemblies 310', and top and bottom edges 330*c*-1, 330*c*-2 of the insulator segments 330*c* are horizontally aligned with top and bottom edges 330*b*-1', 330*b*-2' of the insulator segments 330*b*'. However, top and bottom edges 330*b*-1, 330*b*-2 of the insulator segments 330*b* in the heating block assemblies 310 are not horizontally aligned with top and/or bottom edges of any of the insulator segments 330*a*', 330*b*' in the heating block assemblies 310'.

With continued reference to FIGS. 5-7, each heating block assembly 110, 210/210', 310/310' comprises a respective heating element 158, 258, 358, while every other heating block assembly 110, 210/210', 310/310' comprises a respective temperature sensor 170, 270, 370. The heating block assemblies 110, 210/210', 310/310' may be controlled in pairs. As shown in FIG. 5, the four heating block assemblies 110 may comprise two pairs 128*a*, 128*b*, in which each pair 128*a*, 128*b* comprises two heating elements 158 and one temperature sensor 170. In FIG. 6, the four heating block assemblies 210, 210' may likewise comprise two pairs 228*a*, 228*b*, in which each pair 228*a*, 228*b* comprises two heating elements 258 and one temperature sensor 270. In FIG. 7, 12 heating block assemblies 310, 310' are shown, which may comprise six pairs 328*a*, 328*b* (only two pairs are labeled), in which each pair 328*a*, 328*b* comprises two heating elements 358 and one temperature sensor 370. As shown in FIG. 5, in some examples, the insulator and/or conductor configuration of one pair 128*a* of the heating block assemblies 110 may be the same as the insulator and/or conductor configuration of an adjacent pair 128*b* of the heating block assemblies 110. As shown in FIGS. 6 and 7, the insulator and/or conductor configuration of one pair 228*a*, 328*a* of the heating block assemblies 210, 310 may be different from the insulator and/or conductor configuration of an adjacent pair 228*b*, 328*b* of the heating block assemblies 210', 310'.

A controller (not shown; see FIG. 1) may be operatively coupled to the heating elements 158, 258, 358 and temperature sensors 170, 270, 370. The controller may receive temperature sensor data from one heating block assembly 110, 210/210', 310/310' within each pair 128*a*, 128*b*, 228*a*, 228*b*, 328*a*, 328*b* and may control operation of both heating elements 158, 258, 358 within each pair 128*a*, 128*b*, 228*a*, 228*b*, 328*a*, 328*b* based on the temperature sensor data. In particular, in some instances as described herein, the controller may selectively control operation of the pairs 128*a*, 128*b*, 228*a*, 228*b*, 328*a*, 328*b* of heating block assemblies 110, 210/210', 310/310', e.g., by selectively providing power to the heating block assemblies 110, 210/210', 310/310', to achieve a desired configuration of the respective heat sealing surface 160, 260, 360. Selectively providing power to the pairs 128*a*, 128*b*, 228*a*, 228*b*, 328*a*, 328*b* of heating block assemblies 110, 210/210', 310/310' may comprise adjusting a horizontal location of the one or more heating zones within the heat sealing surfaces 160, 260, 360, as the heating block assemblies 110, 210/210', 310/310' and their respective heating zones are located at different horizontal locations within the respective heat sealing apparatus 100, 200, 300.

Figure 8:
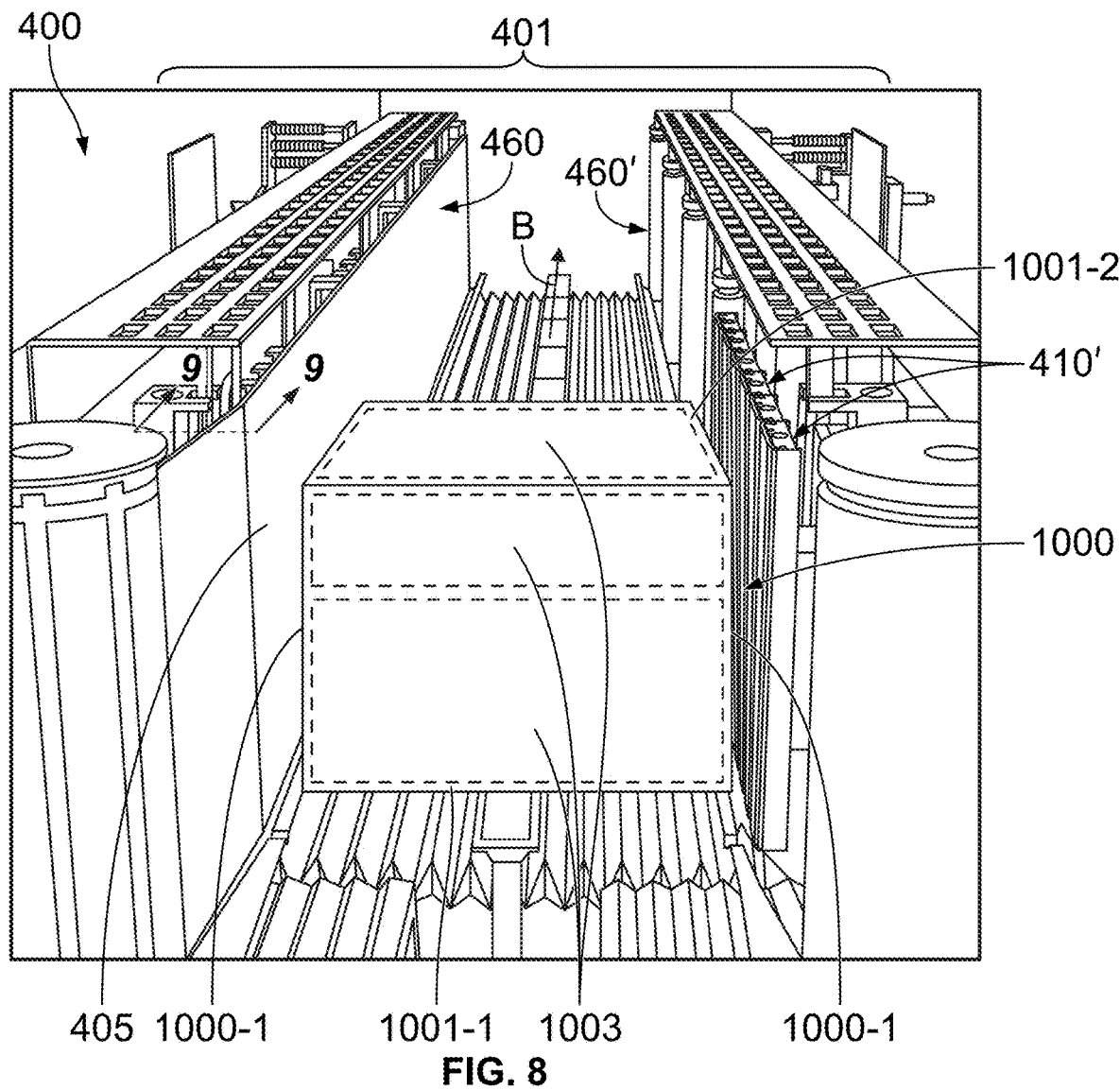
FIG. 8 is a perspective view of a heat sealing apparatus comprising a plurality of heating block assemblies positioned opposite one another.

FIG. 8 depicts an exemplary heat sealing section 401, which may be positioned within a larger wrapping and sealing device (not shown). A heat sealing apparatus 400 within the heat sealing section 401 may comprise a first configurable heat sealing surface 460 and a second configurable heat sealing surface 460' for sealing one or more portions of a package 1000. The package 1000 comprises a folded plastic overwrap, e.g., polyethylene, and at least a portion of the package 1000 may comprise one or more graphics 1003. For example, as shown panels 1001-1, 1001-2 comprise one or more graphics 1003, which are indicated with dashed lines.

The package 1000 may be delivered to a conveyer 403, e.g., a conveyer belt, that advances the package 1000 through the heat sealing section 401 along the first and second configurable heat sealing surfaces 460, 460' in a direction indicated by arrow B. A sealing belt 405 may be positioned between the package 1000 and the first configurable heat sealing surface 460. Although not shown, a sealing belt would similarly be positioned on the right side of the heat sealing apparatus 400 between the second configurable heat sealing surface 460' and the package 1000. After passing through the heat sealing section 401, the package 1000 may then enter a heat shrink tunnel (not shown) where the package 1000 undergoes a heat shrinking process and the overwrap material shrinks to create a tight fit.

Figure 9:
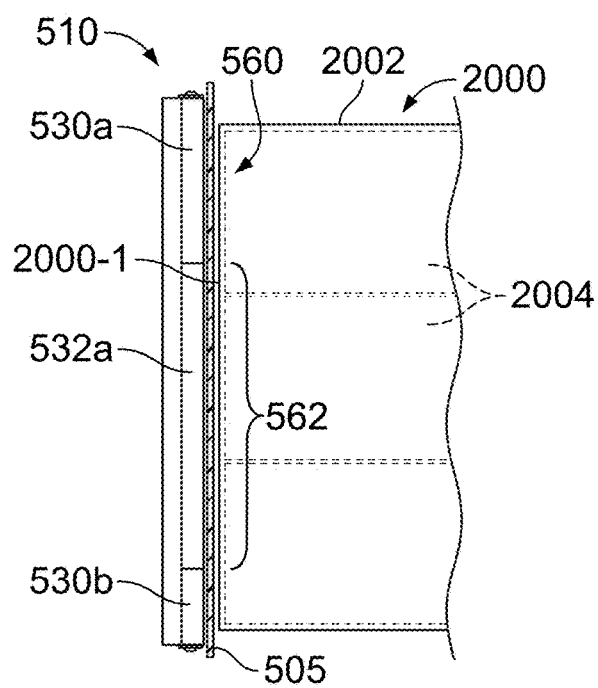
FIG. 9 is a partial cross-sectional view taken along line 9-9 in FIG. 8.
Figure 10:
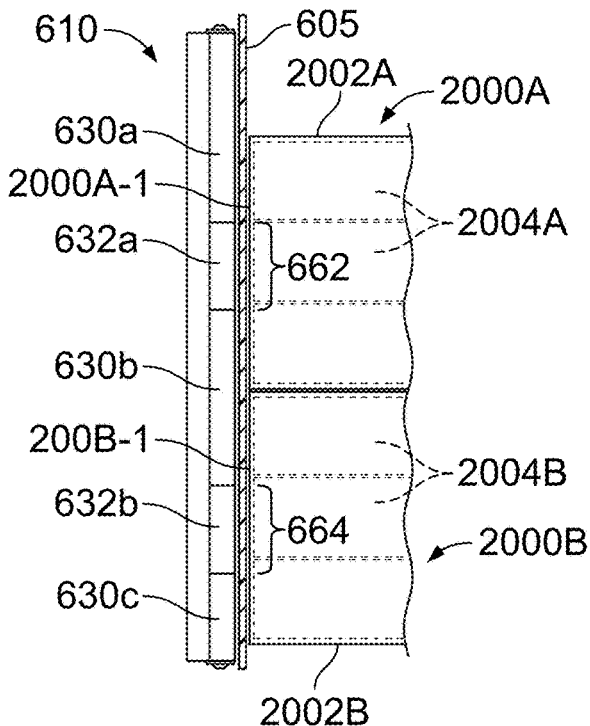
FIG. 10 is a partial cross-sectional view similar to FIG. 9 of another exemplary heat sealing surface.

The first configurable heat sealing surface 460 may be positioned to seal one or more sections of a first end surface 1000-1 of the package 1000 and may comprise a plurality of heating block assemblies (not shown, obscured by the sealing belt 405; see FIGS. 9 and 10). The second configurable heat sealing surface 460' may be positioned opposite the first configurable heat sealing surface 460 to seal one or more sections of a second end surface 1000-2 of the package 1000, the second end surface 1000-2 of the package 1000 being opposite the first end surface 1000-2. The second configurable heat sealing surface 460' may similarly comprise a plurality of heating block assemblies 410' (the sealing belt on the right side of the heat sealing apparatus 400 is removed to show the heating block assemblies 410' and several components of the heating block assemblies 410' are omitted to illustrate other aspects in detail). The one or more sections of the first and second end surfaces 1000-1, 1000-2 may be sealed substantially simultaneously, e.g., by advancing the package 1000 through the heat sealing section 401 and applying heat to both end surfaces 1000-1, 1000-2 simultaneously from the first and second configurable heat sealing surfaces 460, 460'.

The heating block assemblies 410' of the first and second configurable heat sealing surfaces 460, 460' may comprise any insulator and/or conductor segment configuration described herein. As discussed in more detail with respect to FIGS. 9 and 10, the insulator and/or conductor segment configuration of the heating block assemblies 410' in the first and second configurable heat sealing surfaces 460, 460' may be selectively adjusted to achieve a desired a number of heating zones (not labeled; see FIGS. 9 and 10), a vertical location of the one or more heating zones, a horizontal location of the one or more heating zones, and/or a dimension of the one or more heating zones. Heat from the heating block assemblies 410' through the sealing belts 405 and into one or more sections of the end surfaces 1000-1, 1000-2 of the package 1000 as the package 1000 is advanced along the first and second configurable heat sealing surfaces 460, 460' adjacent to the one or more heating zones. The sealing belts 405 may also help to advance the package 1000 through the heat sealing section 401.

The first and second configurable heat sealing surfaces 460, 460' may each comprise 24 heating block assemblies 410' for a total of 48 heating block assemblies in the heat sealing apparatus 400. The 24 heating block assemblies 410' of the second configurable heat sealing surface 460' are horizontally aligned, side-by-side, with each other along their longitudinal lengths (not labeled; see FIG. 1) as shown, and the 24 heating block assemblies (not visible) of the first configurable heat sealing surface 460 are horizontally aligned, side-by-side, with each other along their longitudinal lengths. The heating block assemblies 410' are also aligned with corresponding ones of the 24 heating block assemblies in the first configurable heat sealing surface 460. The heating block assemblies 410' may be controlled in pairs, as described herein in detail. In some examples, the heat sealing apparatus 400 may comprise 24 heating sections defined by one pair of heating block assemblies, with each of the first and second configurable heat sealing surfaces 460, 460' comprising 12 respective heating sections. In some instances, a pair of heating block assemblies in the first configurable heat sealing surface 460 and a pair of heating block assemblies 410' in the second configurable heat sealing surface 460' immediately opposite the pair of heating block assemblies in the first configurable heat sealing surface 460 may comprise the same insulator and/or conductor segment configuration. In other instances, the pairs of opposing heating block assemblies 410' in the first and second configurable heat sealing surfaces 460, 460' may comprise different insulator and/or conductor segment configurations. In both instances, the pairs of opposing heating block assemblies 410' may be operated at a same temperature or at a different temperature.

With reference to FIGS. 9 and 10, exemplary heating block assemblies 510, 610 are depicted with respect to one or more packages 2000, 2000A, 2000B. The heating block assembly 510 may at least partially define a configurable heat sealing surface 560. The heating block assembly 510 may comprise an insulator and/or conductor segment configuration that is substantially similar to the heating block assemblies 10, 210, 310' depicted in FIGS. 2, 6, and 7 and may comprise insulator segments 530a, 530b spaced apart by a conductor segment 532a to define one large heating zone 562. Heat passes from the conductor segment 532a through a sealing belt 505 and into a first end surface 2000-1 of the package 2000 to seal one or more sections of the first end surface 2000-1. In particular, heat from the heating zone 562 seals one or more sections of an overwrap 2002 that is formed around a matrix of articles 2004 (depicted with dashed lines), e.g., absorbent articles such as boxes of facial tissue, packages of diapers, etc., by fusing together two or more layers of a material of the overwrap 2002 adjacent to the heating zone 562.

The heating block assembly 610 in FIG. 10 may at least partially define a configurable heat sealing surface 660. The heating block assembly 610 may comprise an insulator and/or conductor segment configuration that is substantially similar to the heating block assemblies 10', 110, 310 depicted in FIGS. 4, 5, 7 and may comprise insulator segments 630a-630c and conductor segments 632a, 632b, in which the insulator segments 630a, 630b are spaced apart by the conductor segment 632a and the insulator segments 630b, 630c are spaced apart by the conductor segment 632b. The conductor segments 632a, 632b define first and second heating zones 662, 664, respectively. The heating block assembly 610 may be used to seal one or more sections of a first package 2000A and a second package 2000B, in which the first package 2000A is positioned above or stacked on top of the second package 2000B and advances with the second package 2000B through the heat sealing section (see FIG. 8). Heat passes from the conductor segment 632a through a sealing belt 605 and into a first end surface 2000A-1 of the first package 2000A to seal one or more sections of the first end surface 2000A-1. In particular, heat from the first heating zone 662 seals one or more sections of an overwrap 2002A that is formed around a matrix of articles 2004A (shown with dashes lines) by fusing together two or more layers of a material of the overwrap 2002A adjacent to the first heating zone 662. Heat similarly passes from the conductor segment 632b through the sealing belt 605 and into a first end surface 2000B-1 of the second package 2000B, such that heat from the second heating zone 664 fuses together two or more layers of a material of an overwrap 2002B to substantially simultaneously seal one or more sections of the first end surface 2000B-1, e.g., one or more sections of the overwrap 2002B that is formed around a matrix of articles 2004B (shown with dashed lines).

Although two packages 2000A, 2000B are depicted in FIG. 10, it may be understood that three or more packages may be stacked on top of each other. In addition, it should be understood that the heat sealing surface 660 depicted in FIG. 10 may also be used to seal two or more sections of an end surface of a single package, e.g., package 2000 as shown in FIG. 9, in which the package comprises dimensions that place portions of the end surface adjacent to both the first and second heating zone 662, 664. It should further be understood that a heating block assembly in accordance with the present disclosure may comprise three or heating zones (not shown) that may be used to seal one or more sections of one or more packages.

A second configurable heat sealing surface (not shown; see FIG. 8) may be positioned opposite the heat sealing surface 560 in FIG. 9 and may comprise an insulator and/or conductor segment configuration that is similar to the configuration of the heat sealing surface 560 in order to seal one or more sections of a second end surface (not shown; see FIG. 8) of the package 2000. A second configurable heat sealing surface (not shown; see FIG. 8) may likewise be positioned opposite the heat sealing surface 660 in FIG. 10 and may comprise an insulator and/or conductor segment configuration that is similar to the configuration of the heat sealing surface 660 in order to seal one or more sections of a second end surface (not shown; see FIG. 8) of the first and second package 2000A, 2000B. The one or more sections of the first and second end surfaces 2000-1, 2000A-1, 2000B-1 of the respective packages 2000, 2000A, 2000B may be sealed substantially simultaneously, e.g., by advancing the packages 2000, 2000A, 2000B through a heat sealing section similar to that shown in FIG. 8 in which heat is applied to both end surfaces of the package from a series of aligned heating block assemblies.

Figure 11:
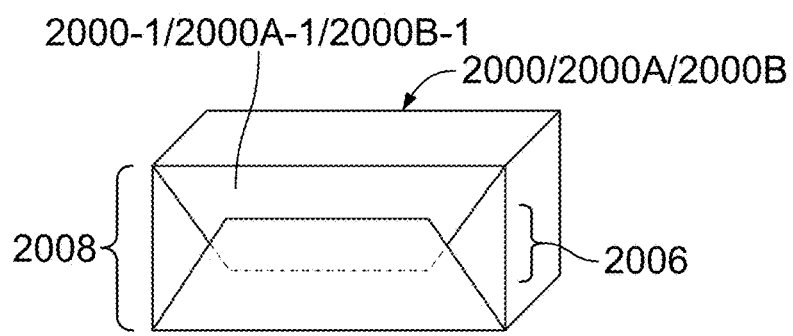
FIG. 11 is an end view of a package sealed with a heat sealing apparatus, in accordance with the present disclosure.

FIG. 11 depicts an envelope folding pattern and a heat-affected zone 2006 in the first end surface 2000-1, 2000A-1, 2000B-1 that may be generated after the packages 2000, 2000A, 2000B are advanced along a respective one of the configurable heat sealing surfaces 560, 660 in FIGS. 9 and 10. For comparison, a conventional heat-affected zone 2008 is shown. The conventional heat-affected zone 2008 is generated using a conventional heat sealing apparatus as described herein, in which a single, large heating zone extending across an entirety of the heat sealing surface subjects substantially an entirety of the end surface of the package to heating. Portions of overwrap material in the large, conventional heat-affected zone 2008 undergo premature heat shrinking and generate a complete seal of the first end surface 2000-1, 2000A-1, 2000B-1 prior to entering the heat shrink tunnel, which leads to bunching and veining. A vertical dimension of the heat-affected zone 2006 produced by the heat sealing surfaces 560, 660 in accordance with the present disclosure is much smaller, as compared to the conventional heat-affected zone 2008. This smaller vertical dimension of the heat-affected zone 2006 minimizes or eliminates premature heat shrinking, which allows the overwrap material to flow properly during heat shrinking and reduces veining on the display panel(s) (not labeled), as shown below. In some instances, because the heat-affected zone 2006 produced in accordance with the present disclosure is smaller than the conventional heat-affected zone 2008, additional heating time and/or higher temperatures may be needed to ensure that the seal between the layers of the overwrap material has enough strength to avoid separation during conveyance and/or during the heat shrinking process. Although only one heat affected zone 2006 is depicted in FIG. 11, it is understood that the package 2000, 2000A, 2000B may comprise two or more heat affected zones (not shown), in which the number of heat affected zones corresponds to the number of heating zones.

Figure 13:
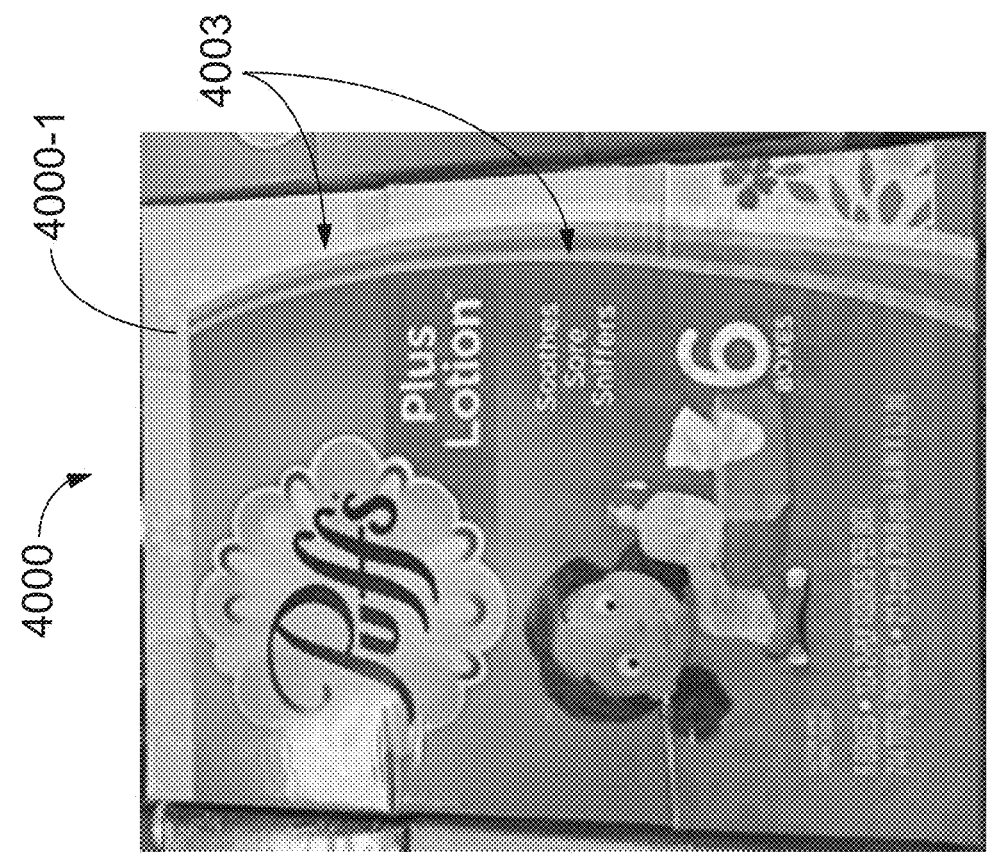
FIGS. 12-15 are photographs of packages formed using conventional methods and methods in accordance with the present disclosure.
Figure 12:
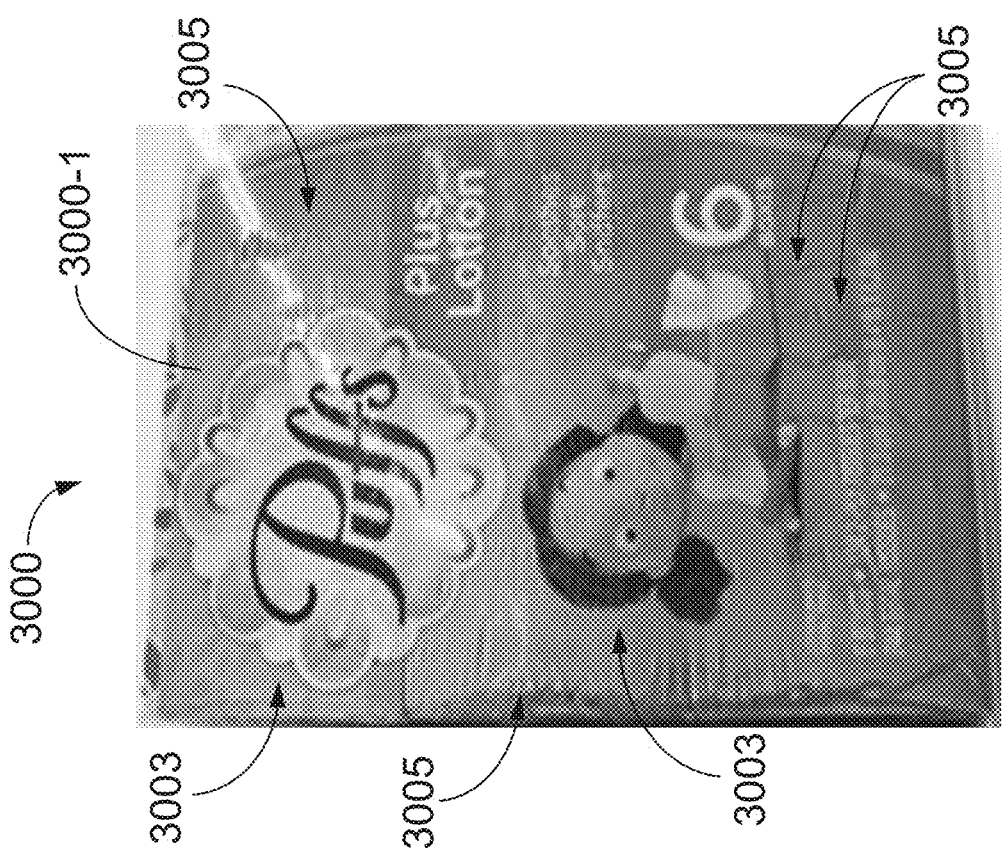
Figure 14:
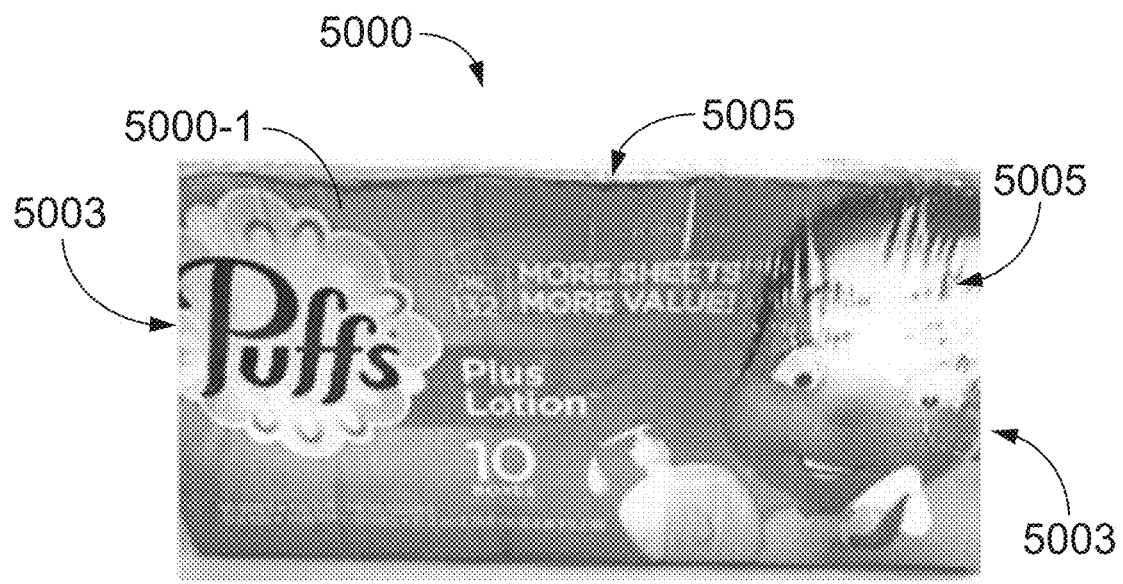
Figure 15:
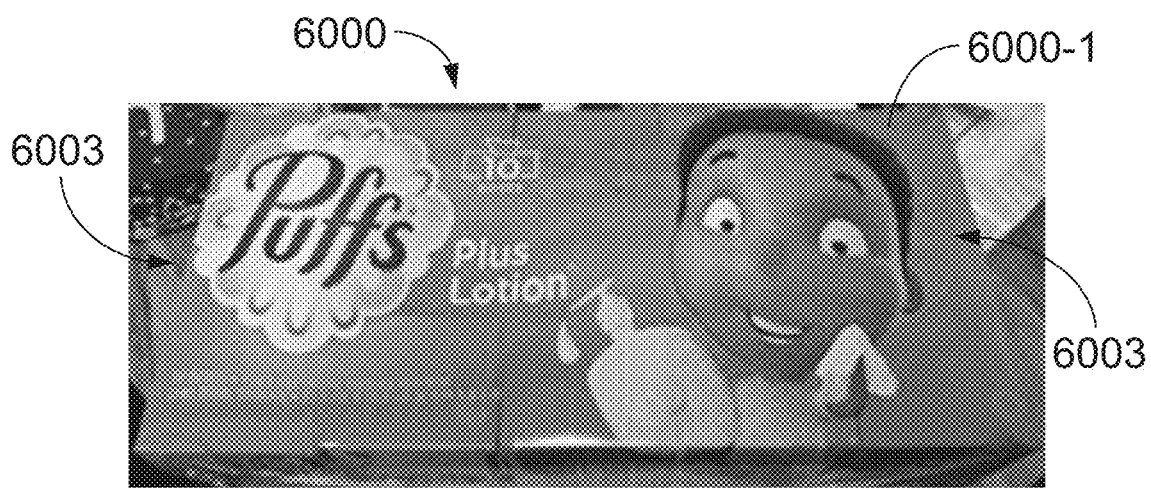

FIGS. 12 and 14 are photographs of packages formed using conventional processes, and FIGS. 13 and 15 are photographs of similar packages formed using processes in accordance with the present disclosure. With reference to FIG. 12, a package 3000 containing six boxes of facial tissues comprises a display panel 3000-1 with graphics 3003 extending over substantially an entirety thereof. The package 3000 is made with a conventional heat sealing process. It can be seen that the display panel 3000-1 includes several defects 3005 where the overwrap material is bunched together and ink from the graphics 3003 is collected to form dark, visible lines. In addition, the display panel 3000-1 includes defects 3005 in the form of stretching, wrinkling, and distortion, which are believed to be due to uneven shrinking of the overwrap material. FIG. 13 is a photograph of a substantially similar package 4000 with substantially similar graphics 4003, in which the package 4000 is formed in accordance with the present disclosure. It can be seen that a display panel 4000-1 of the package 4000 contains no visible defects and that the graphics 4003 are clear with no visible distortion or collection of ink.

FIGS. 14 and 15 are photographs of packages 5000, 6000 containing ten boxes of facial tissue. A display panel 5000-1 of the package 5000 of FIG. 14, which is formed using a conventional process, has multiple defects 5005, including bunching of the overwrap material in some areas and overstretching of the overwrap material in other areas. The display panel 5000-1 also includes areas where ink from the graphics 5003 is collected, along with overall distortion and misalignment of the graphics 5003 and areas where the overwrap material is overstretched to the point that portions of the graphics 5003 are washed out. FIG. 15 is a photograph of a substantially similar package 6000 with substantially similar graphics 6003 that is formed in accordance with the present disclosure. It can be seen that a display panel 6000-1 of the package 6000 contains no visible defects and that the graphics 6003 are clear, properly aligned, and contain no visible distortion or collection of ink.

A configuration of a configurable heat sealing surface in accordance with the present disclosure may be quickly and easily changed to accommodate each package 2000 or stack of packages 2000A, 2000B. In a conventional heat sealing apparatus, altering any properties of the heat sealing surface generally requires removing and/or replacing entire heating block assemblies, which can be a difficult and lengthy process. Conducting maintenance likewise requires removing/replacing the entire heating block assembly. In contrast, a configuration of a heat sealing surface in accordance with the present disclosure may be quickly and easily adjusted by altering the insulator and/or conductor segment configuration of one or more heating block assemblies define a different number of heating zones, change a vertical and/or horizontal location of one or more of the heating zones, and/or change a dimension of the one or more heating zones.

For example, following sealing of the package 2000 in FIG. 9, it may be desirable to change the insulator and/or conductor segment configuration of the heating block assembly 510 to a configuration that permits sealing of a double-stack package configuration as shown in FIG. 10. One or more of the insulator and/or conductor segments 530*a*, 530*b*, 532*a* of the heating block assembly 510 may be removed as described herein and replaced with one or more insulator and/or conductor segments of a different length (not labeled; see FIGS. 2 and 4), e.g., the insulator and conductor segments 630*a*-*c*, 632*a*. 632*b* of FIG. 10, such that the configuration of the heat sealing surface 560 is altered without the need to remove the heating block assembly 510. In addition, any damaged insulator and/or conductor segments can easily be removed and replaced without the need to remove the heating block assemblies 510, 610.

In other examples, the controller (not shown; see FIG. 1) may selectively control operation of the heating block assemblies within a heat sealing surface, thereby allowing a single heat sealing surface to accommodate packages of differing dimensions and/or different numbers of packages without the need to change the insulator and/or conductor segment configuration between runs. For instance, the controller may selectively provide power to one or more of the heating block assemblies to achieve a desired configuration of the heat sealing surface, e.g., a desired number, dimension, and/or location of heating zones in a vertical and/or horizontal direction. In particular, the controller may be configured to selectively provide power to pairs of heating block assemblies such that heating zone(s) of one pair of heating block assemblies are a first temperature and heating zone(s) of an adjacent pair of heating block assemblies are a second temperature that is different from the first temperature With reference to FIG. 7, when a (single-stack) package, e.g., package 1000 in FIG. 8, is advanced along the heat sealing surface 360, the controller (not shown; see FIG. 1) may selectively provide power only to the heating elements 358 of pairs 328*b* of heating block assemblies 310', such that only the appropriate heating zone, e.g., heating zone 362', is active (i.e., at or above a temperature necessary to melt the material of the overwrap) and conducting heat to seal only the one or more sections of the first end surface 1000-1 of the package 1000. The heat sealing surface 360 may then be adapted for two (double-stacked) packages, e.g., packages 2000A, 2000B in FIG. 10, by selectively providing power only to the heating elements 358 of pairs 328*a* of heating block assemblies 310, such that only the appropriate heating zone, e.g., heating zones 362, 364, are active and conducting heat to seal only the one or more sections of the first end surfaces 2000A-1, 2000B-1 of the first and the second package 2000A, 2000B.

Alternatively, with continued reference to FIG. 7, the controller (not shown) may provide power to all of the heating block assemblies 310, 310' simultaneously such that the heating zones 362, 364 or 362' of only one of the pairs 328*a* or 328*b* of heating block assemblies 310, 310' are at or above the temperature necessary to melt the material of the overwrap and the heating zones 362, 364 or 362' of the other one of the pairs 328*a* or 328*b* of heating block assemblies 310, 310' are above room temperature but below the temperature necessary to melt the material of the overwrap. In the case of a polyethylene overwrap, when a (single-stack) package (not shown) is advanced along the heat sealing surface 360, the controller may provide power to the pairs 328*a* of heating block assemblies 310 such that the heating zones 362, 364 are at a temperature necessary to melt polyethylene, e.g., 150° C. or higher. The controller may simultaneously provide power to the adjacent pairs 328*b* of heating block assemblies 310' such that the heating zone 362' is at a lower temperature, e.g., 125° C., that does not melt polyethylene. This selective control of the heating block assemblies 310, 310' limits the dimensions of the heat-affected zone of the package (see FIG. 11). For double-stacked packages, the controller may provide power such that the heating zones 362, 364, 362' of all of the heating block assemblies 310, 310' are at or above 150° C. Maintaining the inactive pair(s) of heating block assemblies at a minimum temperature that is above room temperature but below the temperature needed to melt the material of the overwrap may minimize the time needed to bring the heating zones of the inactive pairs to the required temperature and may increase the number of runs that may be performed using a single configurable heat sealing surface.

Figure 16:
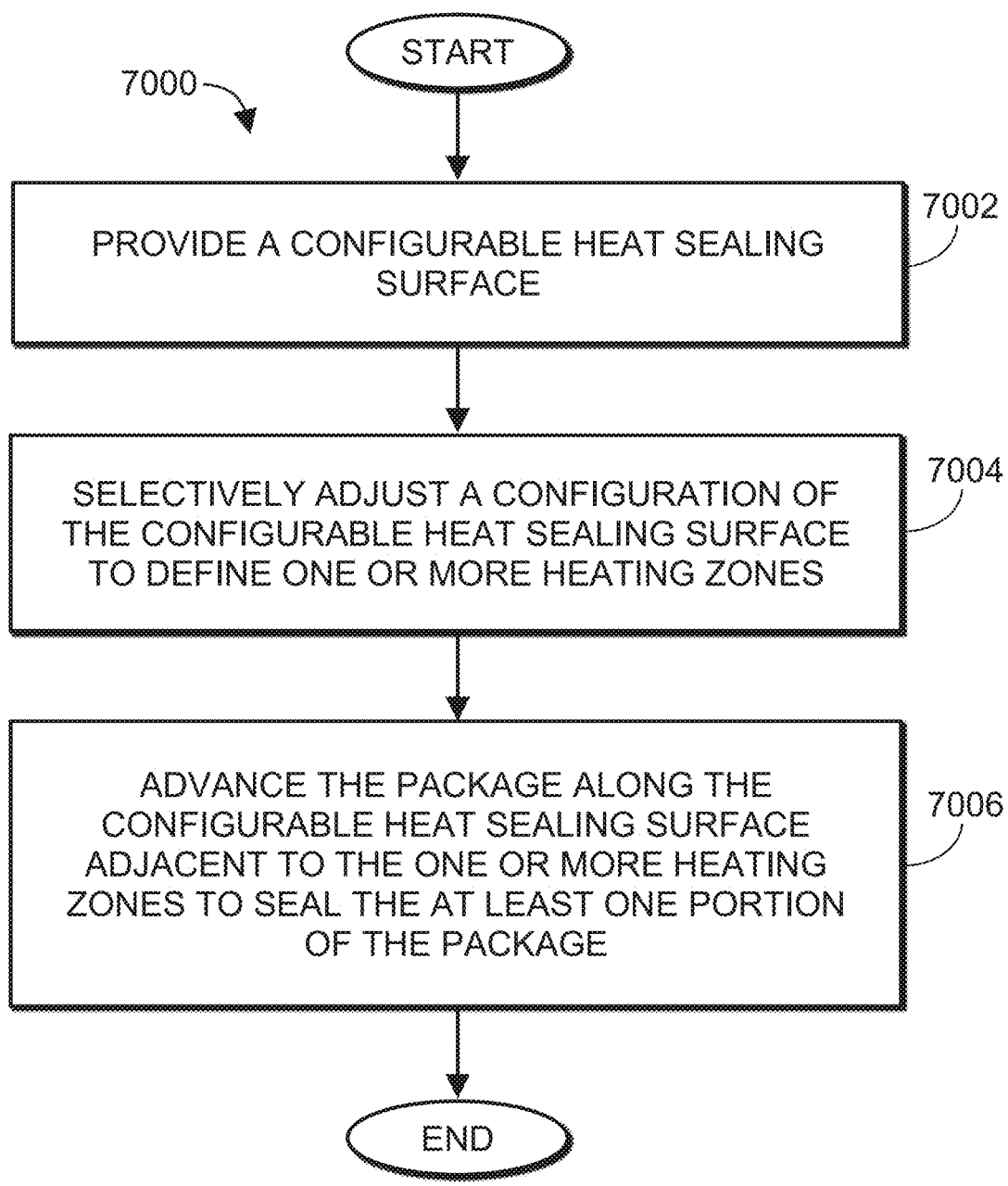
FIG. 16 is a flow diagram illustrating an exemplary method for sealing at least one portion of a package, in accordance with the present disclosure.

FIG. 16 is a flow diagram illustrating an exemplary method 7000 for sealing at least one portion of a package in accordance with the present disclosure. The method 7000 begins providing a configurable heat sealing surface at Step 7002 and selectively adjusting a configuration of the configurable heat sealing surface to define one or more heating zones at Step 7004. At Step, 7006, the package is advanced along the configurable heat sealing surface adjacent to the one or more heating zones to seal the at least one portion of the package, after which the method 7000 may conclude.

Representative embodiments of the present disclosure described above can be described as follows:

A. A heating block assembly comprising:
one or more configurable insulator segments; and
a heater block comprising a first surface configured to removably receive the one or more configurable insulator segments,
wherein each of the one or more configurable insulator segments covers only a portion of the first surface.

B. The heating block assembly according to paragraph A, wherein each of the one or more configurable insulator segments comprises an inner surface positioned adjacent to the first surface of the heater block and an outer surface opposite the inner surface.

C. The heating block assembly according to paragraph B, wherein each of the one or more configurable insulator segments comprises a thickness of between 2.9 and 3.1 mm, wherein the thickness is defined between the inner and outer surfaces.

D. The heating block assembly according to paragraphs B or C, wherein a temperature of the outer surface of each of the one or more configurable insulator segments is between 20% and 30% less than a temperature of the first surface of the heater block.

E. The heating block assembly of according to any of paragraphs A to D, wherein the first surface of the heater block comprises a first extension and a second extension and wherein each of the one or more configurable insulator segments comprises a first corresponding channel and a second corresponding channel configured to receive the respective first and second extensions.

F. The heating block assembly according to any of paragraphs A to E, wherein the heater block comprises aluminum and wherein each of the one or more configurable insulator segments comprises polyether ether ketone.

G. The heating block assembly according to any of paragraphs A to F, wherein the heater block is configured to receive a heating cartridge and the heater block comprises a thermally conductive material.

H. The heating block assembly according to any of paragraphs A to G, further comprising one or more configurable conductor segments each comprising a thermally conductive material.

I. The heating block assembly according to paragraph H, wherein the one or more configurable insulator segments comprise a first insulator segment and a second insulator segment, and wherein the first and second insulator segments are spaced apart from each other along a longitudinal length of the heater block by at least one of the one or more configurable conductor segments to define at least one heating zone.

J. The heating block assembly according to paragraph I, wherein the first insulator segment comprises a first length and the second insulator segment comprises a second length that is the same as or different from the first length.

K. A heat sealing apparatus comprising at least a first heating block assembly and a second heating block assembly, each of which comprises:
 one or more configurable insulator segments; and
 a heater block comprising a first surface configured to removably receive the one or more configurable insulator segments,
 wherein each of the one or more configurable insulator segments covers only a portion of the first surface.

L. The heat sealing apparatus according to paragraph K, wherein the first heating block assembly comprises a first insulator segment and the second heating block assembly comprises a second insulator segment, and wherein when the first and second heating block assemblies are positioned side-by-side, at least one of top edges or bottom edges of the first and second insulator segments are horizontally aligned with each other.

M. The heat sealing apparatus according to paragraphs K or L, further comprising a plurality of configurable conductor segments, wherein the first heating block assembly comprises first and second insulator segments spaced apart from each other along a longitudinal length of the heater block of the first heating block assembly by at least one of the plurality of configurable conductor segments, and wherein the second heating block assembly comprises third and fourth insulator segments spaced apart from each other along a longitudinal length of the heater block of the second heating block assembly by at least one of the plurality of configurable conductor segments.

N. The heat sealing apparatus according to paragraph M, wherein the first and second heating block assemblies are positioned side-by-side and wherein at least one of: at least one of top edges or bottom edges of the first and third insulator segments are horizontally aligned with each other; or at least one of top edges or bottom edges of the second and fourth insulator segments are horizontally aligned with each other.

O. The heat sealing apparatus according to any of paragraphs K to N, wherein the first heating block assembly is positioned to at least partially define a first heat sealing surface configured to seal a portion of a first end surface of a package, and wherein the second heating block assembly is positioned opposite the first heating block assembly to at least partially define a second heat sealing surface configured to seal a portion of a second end surface of the package.

P. A heat sealing apparatus comprising: a configurable heat sealing surface comprising one or more heating zones each defined by one or more configurable insulator segments and one or more configurable conductor segments, wherein each of the one or more configurable insulator segments covers only a portion of the configurable heat sealing surface.

Q. The heat sealing apparatus according to paragraph P, wherein the configurable heat sealing surface comprises a first configurable heat sealing surface, the heat sealing apparatus further comprising: a second configurable heat sealing surface comprising one or more second heating zones each defined by one or more second configurable insulator segments and one or more second configurable conductor segments, wherein each of the one or more second configurable insulator segments covers only a portion of the second configurable heat sealing surface.

R. The heat sealing apparatus according to paragraph Q, wherein the first configurable heat sealing surface comprises a first insulator segment configuration and wherein the second configurable heat sealing surface comprises a second insulator segment configuration that is the same as or different from the first insulator segment configuration.

S. The heat sealing apparatus according to paragraphs Q or R, wherein the first configurable heat sealing surface comprises one or more first heating block assemblies, each of the one or more first heating block assemblies comprising a first heater block with a first surface configured to removably receive the one or more configurable insulator and conductor segments, wherein the one or more configurable insulator segments each cover only a portion of the first surface of the first heater block; and the second configurable heat sealing surface comprises one or more second heating block assemblies, each of the one or more second heating block assemblies comprising a second heater block with a first surface configured to removably receive the one or more second configurable insulator and conductor segments, wherein the one or more second configurable insulator segments each cover only a portion of the first surface of the second heater block.

T. The heat sealing apparatus according to paragraph S, wherein the one or more first heating block assemblies comprise a first plurality of heating block assemblies, the first plurality of heating block assemblies comprising a first pair of heating block assemblies and a second pair of heating block assemblies positioned side-by-side with the first pair of heating block assemblies, the heat sealing apparatus further comprising: a controller operatively coupled to each of the first plurality of heating block assemblies and configured to selectively operate the first and second pairs of heating block assemblies.

U. The heat sealing apparatus according to paragraph T, wherein the first pair of heating block assemblies comprises a first insulator segment configuration and the second pair of heating block assemblies comprises a second insulator segment configuration that is different from the first insulator segment configuration, the controller being configured to selectively provide power to the first and second pair of heating block assemblies such that the one or more heating zones of the first pair of heating block assemblies comprise a first temperature and the one or more second heating zones of the second pair of heating block assemblies comprise a second temperature that is different from the first temperature.

V. A method for sealing at least one portion of a package, the method comprising:
  providing a configurable heat sealing surface;
  selectively adjusting a configuration of the configurable heat sealing surface to define one or more heating zones; and
  advancing the package along the configurable heat sealing surface adjacent to the one or more heating zones to seal the at least one portion of the package.

W. The method according to paragraph V, wherein selectively adjusting the configuration of the configurable heat sealing surface comprises adjusting at least one of (i) a number of heating zones, (ii) a vertical location of the one or more heating zones, (iii) a horizontal location of the one or more heating zones, or (iv) a dimension of the one or more heating zones.

X. The method according to paragraphs V or W, wherein the configurable heat sealing surface comprises a plurality of heating block assemblies each comprising a heater block with one or more configurable insulator segments and one or more configurable conductor segments that define the one or more heating zones.

Y. The method according to paragraph X, wherein selectively adjusting the configuration of the configurable heat sealing surface comprises, for each of the plurality of heating block assemblies, selectively positioning the one or more configurable insulator and conductor segments along a longitudinal length of the heater block to define the one or more heating zones.

Z. The method according to paragraphs X or Y, wherein the plurality of heating block assemblies comprise a first pair of heating block assemblies and a second pair of heating block assemblies, the method further comprising: selectively operating the first and second pairs of heating block assemblies to seal the at least one portion of the package.

AA. The method according to paragraph Z, wherein the first and second pair of heating block assemblies are positioned side-by-side.

BB. The method according to paragraphs Z or AA, wherein the package comprises a first package, the method further comprising: selectively providing power to the first pair of heating block assemblies to seal the at least one portion of the first package; after sealing the at least one portion of the first package, advancing a second package along the configurable heat sealing surface; and selectively providing power to the second pair of heating block assemblies to seal at least one portion of the second package.

CC. The method according to paragraph BB, wherein the first pair of heating block assemblies comprises a first insulator segment configuration and the second pair of heating block assemblies comprises a second insulator segment configuration different from the first insulator segment configuration.

DD. The method according to any of paragraphs V to CC, wherein the configuration of the configurable heat sealing surface comprises a first configuration, the method further comprising: after sealing the at least one portion of the package, selectively adjusting the configuration of the configurable heat sealing surface to comprise a second configuration defining one or more second heating zones, the second configuration being different from the first configuration.

EE. The method according to paragraph DD, further comprising: advancing a second package along the configurable heat sealing surface adjacent to the one or more second zones to seal at least one portion of the second package.

FF. The method according to any of paragraphs V to EE, wherein the one or more heating zones comprise a first heating zone and a second heating zone that is positioned above or below the first heating zone, and wherein the package comprises a first package, the method further comprising: positioning a second package above or below the first package; and advancing the second package along the configurable heat sealing surface with the first package, wherein one of the first or the second heating zone seals the at least one portion of the first package and the other of the first or the second heating zone simultaneously seals at least one portion of the second package.

GG. The method according to any of paragraphs V to FF, wherein the configurable heat sealing surface comprises a first configurable heat sealing surface, the method further comprising: providing a second configurable heat sealing surface positioned opposite the first configurable heat sealing surface; and selectively adjusting a configuration of the second configurable heat sealing surface to define one or more second heating zones.

HH. The method according to paragraph GG, wherein the at least one portion of the package comprises a first end surface and wherein advancing the package along the first configurable heat sealing surface seals at least a section of the first end surface of the package.

II. The method according to paragraph HH, wherein the at least one portion of the package further comprises a second end surface positioned opposite the first end surface, the method further comprising: advancing the package along the second configurable heat sealing surface adjacent to the one or more second heating zones to seal at least one section of the second end surface of the package.

JJ. The method according to paragraph II, wherein the package is advanced along the first and second configurable heat sealing surfaces such that the at least one sections of the first and second end surfaces of the package are sealed simultaneously.

KK. The method according to any of paragraphs V to JJ, further comprising: after advancing the package along the configurable heat sealing surface, subjecting the package to a heat shrinking process.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A heating block assembly comprising:
one or more configurable insulator segments; and
a heater block comprising a longitudinal axis and a first surface that is configured to removably receive the one or more configurable insulator segments, wherein the first surface is configured to receive various configurable insulator segments comprising different longitudinal lengths;
wherein each of the one or more configurable insulator segments covers only a portion of the first surface.

2. The heating block assembly of claim 1, wherein each of the one or more configurable insulator segments comprises an inner surface positioned adjacent to the first surface of the heater block and an outer surface opposite the inner surface.

3. The heating block assembly of claim 2, wherein each of the one or more configurable insulator segments comprises a thickness of between 2.9 and 3.1 mm, wherein the thickness is defined between the inner and outer surfaces.

4. The heating block assembly of claim 2, wherein a temperature of the outer surface of each of the one or more configurable insulator segments is between 20% and 30% less than a temperature of the first surface of the heater block.

5. The heating block assembly of claim 1, wherein the first surface of the heater block comprises a first extension and a second extension and wherein each of the one or more configurable insulator segments comprises a first corresponding channel and a second corresponding channel configured to receive the respective first and second extensions.

6. The heating block assembly of claim 1, wherein the heater block comprises aluminum and wherein each of the one or more configurable insulator segments comprises polyether ether ketone.

7. The heating block assembly of claim 1, wherein the heater block is configured to receive a heating cartridge and the heater block comprises a thermally conductive material.

8. The heating block assembly of claim 1, further comprising one or more configurable conductor segments each comprising a thermally conductive material, wherein the first surface is configured to receive various configurable conductor segments comprising different longitudinal lengths.

9. The heating block assembly of claim 8, wherein the one or more configurable insulator segments comprise a first insulator segment and a second insulator segment, and wherein the first and second insulator segments are spaced apart from each other along the longitudinal axis of the heater block by at least one of the one or more configurable conductor segments to define at least one heating zone.

10. The heating block assembly of claim 9, wherein the first insulator segment comprises a first longitudinal length and the second insulator segment comprises a second longitudinal length that is the same as or different from the first longitudinal length.

11. A heat sealing apparatus comprising at least a first heating block assembly and a second heating block assembly, each of which comprises:
one or more configurable insulator segments; and
a heater block comprising a longitudinal axis and a first surface that is configured to removably receive the one or more configurable insulator segments, wherein the first surface is configured to receive various configurable insulator segments comprising different longitudinal lengths;
wherein each of the one or more configurable insulator segments covers only a portion of the first surface.

12. The heat sealing apparatus of claim 11, wherein the first heating block assembly comprises a first insulator segment and the second heating block assembly comprises a second insulator segment, and wherein when the first and second heating block assemblies are positioned side-by-side, at least one of top edges or bottom edges of the first and second insulator segments are horizontally aligned with each other.

13. The heat sealing apparatus of claim 11, further comprising a plurality of configurable conductor segments, wherein the first heating block assembly comprises first and second insulator segments spaced apart from each other along the longitudinal axis of the heater block of the first heating block assembly by at least one of the plurality of configurable conductor segments, and wherein the second heating block assembly comprises third and fourth insulator segments spaced apart from each other along the longitudinal axis of the heater block of the second heating block assembly by at least one of the plurality of configurable conductor segments.

14. The heat sealing apparatus of claim 13, wherein the first and second heating block assemblies are positioned side-by-side and wherein at least one of:
at least one of top edges or bottom edges of the first and third insulator segments are horizontally aligned with each other; or
at least one of top edges or bottom edges of the second and fourth insulator segments are horizontally aligned with each other.

15. The heat sealing apparatus of claim 11, wherein the first heating block assembly is positioned to at least partially define a first heat sealing surface configured to seal a portion of a first end surface of a package, and wherein the second heating block assembly is positioned opposite the first heating block assembly to at least partially define a second heat sealing surface configured to seal a portion of a second end surface of the package.

16. A heat sealing apparatus comprising:
a first configurable heat sealing surface comprising one or more heating zones each defined by one or more configurable insulator segments and one or more configurable conductor segments, wherein each of the one or more configurable insulator segments covers only a portion of the configurable heat sealing surface;
wherein the first configurable heat sealing surface comprises a first surface that defines a longitudinal axis and that is configured to removably receive various configurable insulator segments comprising different longitudinal lengths of the one or more configurable insulator segments;
wherein the various configurable insulator segments comprising different longitudinal lengths each cover only a portion of the first surface.

17. The heat sealing apparatus of claim 16, the heat sealing apparatus further comprising:
a second configurable heat sealing surface comprising one or more second heating zones each defined by one or more second configurable insulator segments and one or more second configurable conductor segments, wherein each of the one or more second configurable insulator segments covers only a portion of the second configurable heat sealing surface.

18. The heat sealing apparatus of claim 17, wherein the first configurable heat sealing surface comprises a first insulator segment configuration and wherein the second configurable heat sealing surface comprises a second insulator segment configuration that is the same as or different from the first insulator segment configuration.

19. The heat sealing apparatus of claim 17, wherein the first configurable heat sealing surface comprises one or more first heating block assemblies, each of the one or more first heating block assemblies comprising a first heater block with a respective first surface; and the second configurable heat sealing surface comprises one or more second heating block assemblies, each of the one or more second heating block assemblies comprising a second heater block with a first surface configured to removably receive the one or more second configurable insulator and conductor segments, wherein the one or more second configurable insulator segments each cover only a portion of the first surface of the second heater block.

20. The heat sealing apparatus of claim 19, wherein the one or more first heating block assemblies comprise a first plurality of heating block assemblies, the first plurality of heating block assemblies comprising a first pair of heating block assemblies and a second pair of heating block assemblies positioned side-by-side with the first pair of heating block assemblies, the heat sealing apparatus further comprising:

a controller operatively coupled to each of the first plurality of heating block assemblies and configured to selectively operate the first and second pairs of heating block assemblies.

21. The heat sealing apparatus of claim 20, wherein the first pair of heating block assemblies comprises a first insulator segment configuration and the second pair of heating block assemblies comprises a second insulator segment configuration that is different from the first insulator segment configuration, the controller being configured to selectively provide power to the first and second pair of heating block assemblies such that the one or more heating zones of the first pair of heating block assemblies comprise a first temperature and the one or more second heating zones of the second pair of heating block assemblies comprise a second temperature that is different from the first temperature.

* * * * *